(12) United States Patent
Miyazawa

(10) Patent No.: US 11,397,119 B2
(45) Date of Patent: Jul. 26, 2022

(54) TORQUE SENSOR AND POWER CONTROL ACTUATOR

(71) Applicant: SONY CORPORATION, Tokyo (JP)

(72) Inventor: Kiyokazu Miyazawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 978 days.

(21) Appl. No.: 16/078,323

(22) PCT Filed: Feb. 8, 2017

(86) PCT No.: PCT/JP2017/004593
§ 371 (c)(1),
(2) Date: Aug. 21, 2018

(87) PCT Pub. No.: WO2017/195420
PCT Pub. Date: Nov. 16, 2017

(65) Prior Publication Data
US 2019/0064018 A1 Feb. 28, 2019

(30) Foreign Application Priority Data
May 9, 2016 (JP) .............................. JP2016-094022

(51) Int. Cl.
*G01L 5/00* (2006.01)
*B25J 19/02* (2006.01)
(Continued)

(52) U.S. Cl.
CPC ............. *G01L 5/0061* (2013.01); *B25J 19/00* (2013.01); *B25J 19/02* (2013.01); *B25J 19/027* (2013.01);
(Continued)

(58) Field of Classification Search
CPC ....... G01L 5/0061; G01L 3/10; G01L 3/1457; G01L 3/108; B25J 19/00; B25J 19/027; B25J 19/02
(Continued)

(56) References Cited

U.S. PATENT DOCUMENTS 3,481,192 A * 12/1969 Herzog ................. G01M 15/00
73/862.045
5,172,774 A * 12/1992 Melrose .................. B25B 23/14
173/182
(Continued)

FOREIGN PATENT DOCUMENTS

GB         2286055 A * 8/1995 ............. G08C 17/02
JP     2002-120738 A    4/2002
(Continued)

OTHER PUBLICATIONS

International Search Report dated May 9, 2017, in PCT/JP2017/004593, filed Feb. 8, 2017.

*Primary Examiner* — Marrit Eyassu
(74) *Attorney, Agent, or Firm* — Xsensus LLP

(57) ABSTRACT

[Object] To provide a torque sensor and power control actuator that are reduced in size and are capable of detecting torque with high accuracy.
[Solution] The torque sensor includes: a first rotating body capable of making axial rotation about an input axis; a second rotating body capable of making axial rotation about an output axis; a strain generation part provided between the first rotating body and the second rotating body, having a first surface facing one side in a first direction parallel to the input axis and a second surface facing the other side in the first direction, and configured to transfer rotation torque while generating a strain between the first rotating body and the second rotating body; and a plurality of strain detection
(Continued)

parts provided on the first surface and the second surface, respectively, to detect a strain of the strain generation part.

17 Claims, 12 Drawing Sheets

(51) Int. Cl.
    *B25J 19/00*     (2006.01)
    *G01L 3/10*     (2006.01)
    *G01L 3/14*     (2006.01)

(52) U.S. Cl.
    CPC ............... *G01L 3/10* (2013.01); *G01L 3/108* (2013.01); *G01L 3/1457* (2013.01)

(58) Field of Classification Search
    USPC ..................................................... 73/862.338
    See application file for complete search history.

(56) References Cited

U.S. PATENT DOCUMENTS

| | | | |
|---|---|---|---|
| 6,269,702 B1 * | 8/2001 | Lambson | ............... G01L 3/108 |
| | | | 73/862.045 |
| 9,869,597 B1 * | 1/2018 | Reich | ........................ G01L 1/16 |

FOREIGN PATENT DOCUMENTS

| | | | | |
|---|---|---|---|---|
| JP | 2002-202212 A | | | 7/2002 |
| JP | 2004-77172 A | | | 3/2004 |
| JP | 2004077172 A | * | | 3/2004 |
| JP | 2009-288198 A | | | 12/2009 |
| JP | 2010-61487 A | | | 3/2010 |
| JP | 2010061487 A | * | | 3/2010 |
| JP | 2012-132759 A | | | 7/2012 |
| JP | 2013-61305 A | | | 4/2013 |
| JP | 2013-96735 A | | | 5/2013 |
| JP | 2015-34754 A | | | 2/2015 |
| KR | 20080064098 A | * | | 7/2008 |
| WO | WO 2010/142318 A1 | | | 12/2010 |

* cited by examiner

TORQUE SENSOR AND POWER CONTROL ACTUATOR

TECHNICAL FIELD

The present disclosure relates to a torque sensor and a power control actuator.

BACKGROUND ART

In recent years, a power control actuator is used in various devices. For example, a robot arm in which a power control actuator is provided at a joint and a plurality of arms are connected via the joint is known. Power control is to directly receive a target value of power to be applied to a work target, and drive the actuator on the basis of that target value. In power control, by correctly detecting output torque and giving feedback, a flexible and safe operation that provides excellent interaction with humans can be achieved.

Patent Literature 1 discloses a torque sensor that, with driving power input to one end in the axial direction and a load input to the other end in the axial direction, detects torque acting on a strain generation part that transfers torque while causing a twist between the driving side and the load side. Patent Literature 1 discloses a torque sensor, as one aspect of such a torque sensor, in which a sheet-like strain gauge is applied to the inner peripheral surface of a cylindrical strain generation part in an attitude for detecting strains in two directions corresponding to the twist produced in the strain generation part by a torque input to the strain generation part.

CITATION LIST

Patent Literature

Patent Literature 1: JP 2012-132759A

DISCLOSURE OF INVENTION

Technical Problem

However, in the torque sensor described in Patent Literature 1, a strain that occurs in the cylindrical strain generation part to which the strain gauge is applied is minute. In the above-described torque sensor, the strain gauge is arranged such that the longitudinal direction extends along the axial direction of the strain generation part in order to detect such a strain. Thus, the length of the strain generation part in the axial direction must be long to some degree. Therefore, size reduction of the power control actuator including the torque sensor is limited.

Note that the torque sensor described in Patent Literature 1 also includes a speed meter through use of a strain detection part, and the strain detection part used for the speed meter may be attached to a support wall that couples portions of the inner peripheral surface of the strain generation part that are located at positions symmetric to each other about the axis center. However, such a strain detection part is attached to one surface of the support wall whose width (thickness) in the axial direction is relatively small such that the longitudinal direction extends along the radial direction to detect a strain in the radial direction of the support wall, and it is difficult to detect torque with high accuracy using the strain detection part.

Hence, the present disclosure proposes a novel and improved torque sensor and power control actuator that are reduced in size and are capable of detecting torque with high accuracy.

Solution to Problem

According to the present disclosure, there is provided a torque sensor including: a first rotating body capable of making axial rotation about an input axis; a second rotating body capable of making axial rotation about an output axis; a strain generation part provided between the first rotating body and the second rotating body, having a first surface facing one side in a first direction parallel to the input axis and a second surface facing the other side in the first direction, and configured to transfer rotation torque while generating a strain between the first rotating body and the second rotating body; and a plurality of strain detection parts provided on the first surface and the second surface, respectively, to detect a strain of the strain generation part.

In addition, according to the present disclosure, there is provided a power control actuator including: a first rotating body capable of making axial rotation about an input axis; a second rotating body capable of making axial rotation about an output axis; a strain generation part provided between the first rotating body and the second rotating body, having a first surface facing one side in a first direction parallel to the input axis and a second surface facing the other side in the first direction, and configured to transfer rotation torque while generating a strain between the first rotating body and the second rotating body; a plurality of strain detection parts provided on the first surface and the second surface, respectively, to detect a strain of the strain generation part; and an encoder fixed to at least one of the first rotating body and the second rotating body.

Advantageous Effects of Invention

According to the present disclosure as described above, it is possible to reduce a torque sensor in size and to detect torque with high accuracy.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
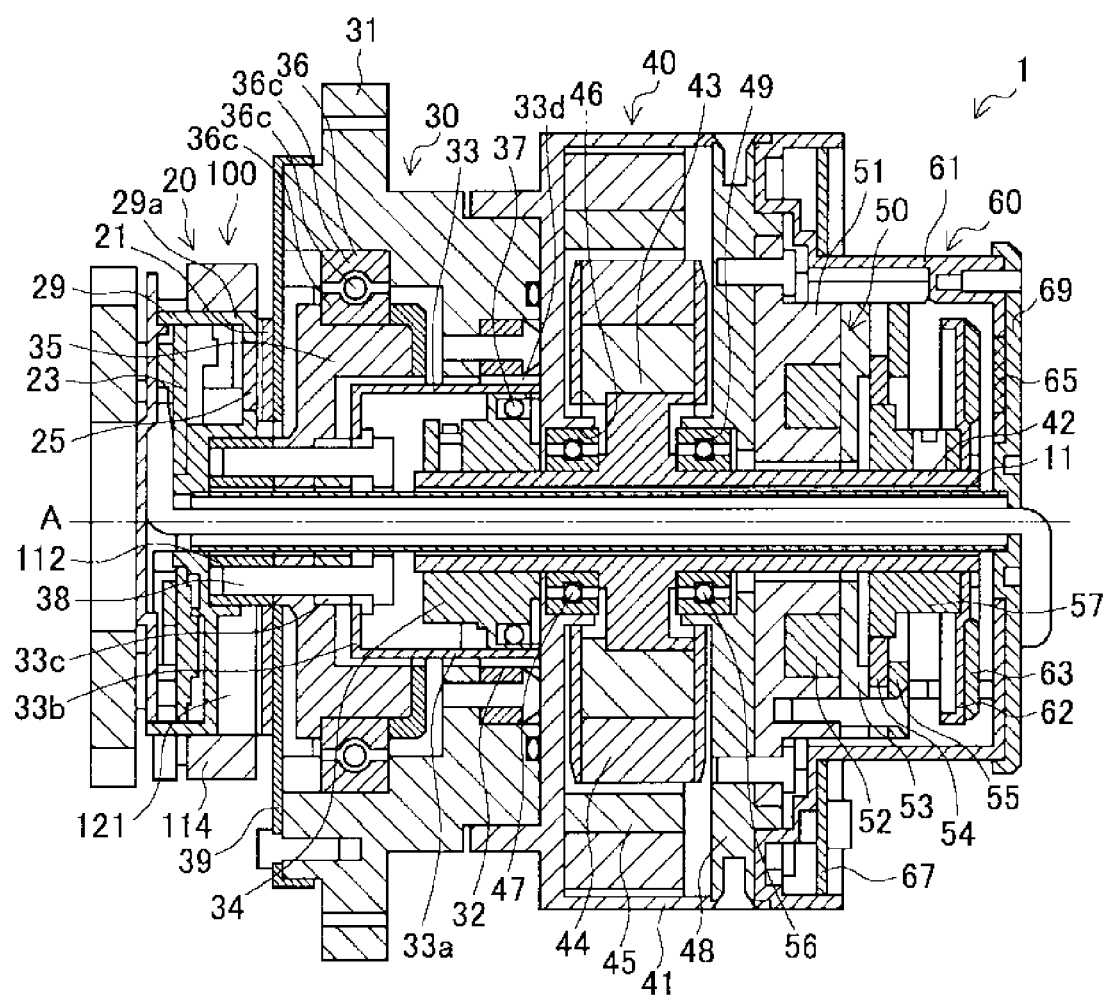
FIG. 1 is a sectional view of a power control actuator according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. First embodiment (example of using sensor elements)
1-1. Overall configuration of power control actuator
1-2. Torque sensor
2. Second embodiment (example of using gauge patterns)
3. Reference example

1. First Embodiment

<1-1. Overall Configuration of Power Control Actuator>

Figure 2:
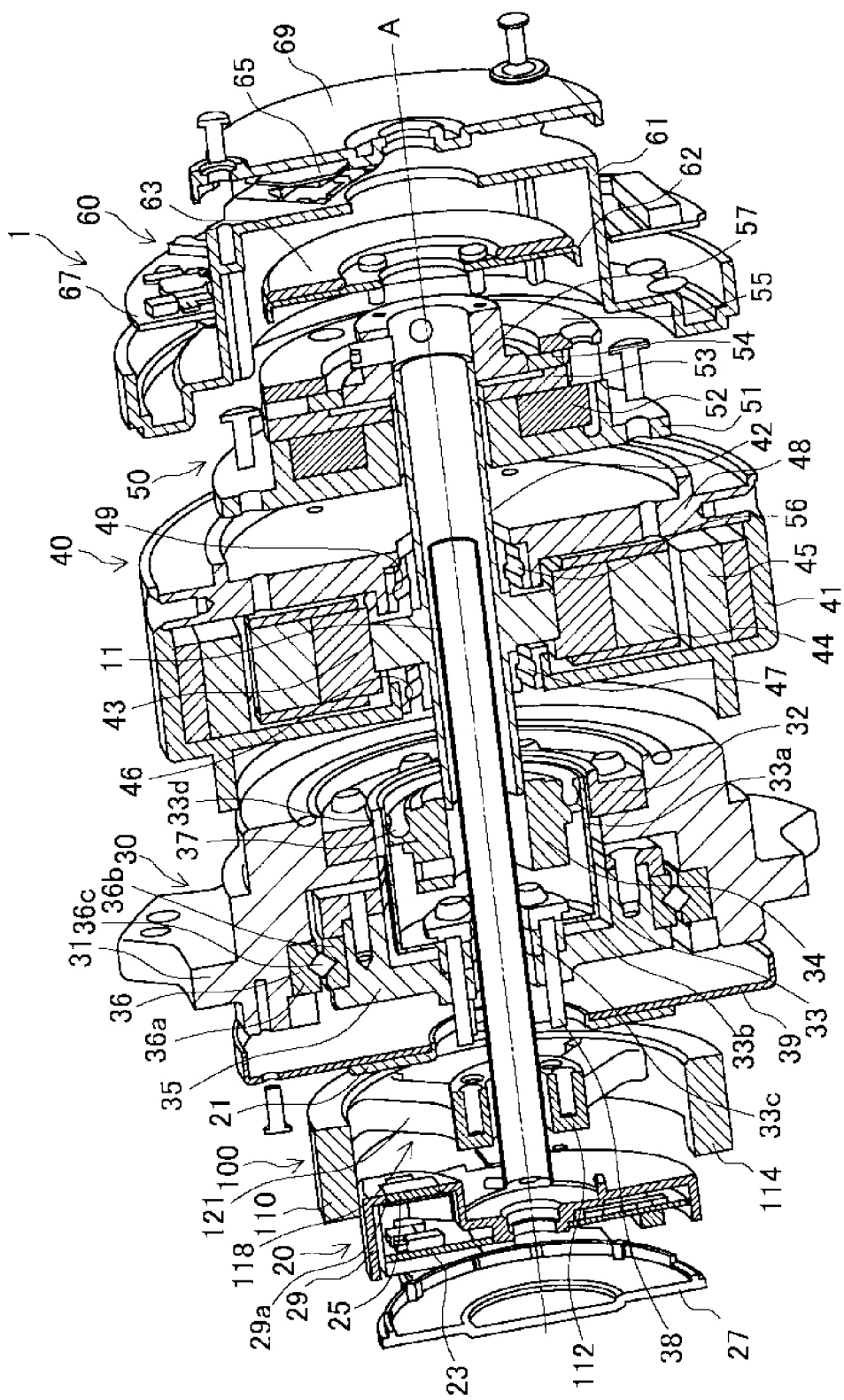
FIG. 2 is an exploded sectional view of the power control actuator according to the embodiment.

First, an overall configuration of a power control actuator 1 according to a first embodiment of the present disclosure will be described with reference to FIG. 1 and FIG. 2. FIG. 1 is a schematic sectional view of the power control actuator 1, and FIG. 2 is an exploded perspective view of the power control actuator 1 shown by the schematic sectional view of FIG. 1.

The power control actuator (hereinafter also referred to as a "rotation actuator") 1 includes a torque sensor 100, an output side encoder 20, a strain wave gearing 30, a motor 40, a brake mechanism 50, and an input side encoder 60. In such a rotation actuator 1, the motor 40 is rotated by energization to generate rotation torque. The strain wave gearing 30 is provided continuously with the motor 40 in a coaxial state, and decelerates and outputs the rotation torque output from the motor 40. The torque sensor 100 transfers the rotation torque transferred from the strain wave gearing 30 to a target of rotation provided continuously on the output side. The input side encoder 60 acquires rotation information of the motor 40. The output side encoder 20 acquires information about the rotation decelerated and output by the strain wave gearing 30.

Note that, in the present specification, "forward" or "front" refers to a direction (the left direction in FIG. 1 and FIG. 2) in which the output side encoder 20 is arranged, and "backward" or "rear" refers to a direction (the right direction in FIG. 1 and FIG. 2) in which the input side encoder 60 is arranged.

(1-1-1. Motor)

The motor 40 is driven by energization, and generates rotation torque. The motor 40 can be a brushless motor, for example. The illustrated motor 40 is a coreless-type DC servo motor, and includes a cylindrical motor housing 41 and a hollow motor shaft 42 arranged in the motor housing 41 concentrically with the motor housing 41. The motor shaft 42 has a hollow shape, and is capable of rotating about the axis of a central axis A of the rotation actuator 1. The motor shaft 42 is arranged over the strain wave gearing 30, the motor 40, the brake mechanism 50, and the input side encoder 60. A pipe 11 extends through the inside of the motor shaft 42. The pipe 11 is held by a cover 69 and an encoder case 29 on the both sides of the rotation actuator 1 in the axial direction.

The motor shaft 42 is supported in a freely rotatable manner by the inner peripheral surfaces of central openings 46, 49 provided in the motor housing 41 and a cover 48 via bearings 47, 56. A large diameter part 43 is provided at the central part of the motor shaft 42 in the axial direction. An annular magnet 44 is attached to the outer periphery of the large diameter part 43. Such large diameter part 43 and magnet 44 are configured as a rotor. An annular coil 45 is attached to the inner periphery of the motor housing 41. Such a coil 45 is configured as a stator.

(1-1-2. Brake Mechanism)

The brake mechanism 50 decelerates the rotation of the motor 40. The brake mechanism 50 is provided on the backward side of the rotor and stator in the inner peripheral part of the motor housing 41. The brake mechanism 50 includes a substrate 51 fixed to the backward side surface of the cover 48 of the motor housing 41, an annular coil 52 fixed to the substrate 51, a movable member 53, a brake plate 55, and a brake disc 54 arranged between the movable member 53 and the brake plate 55. Among them, the brake plate 55 is fixed to the substrate 51. In addition, the brake disc 54 is fixed to the motor shaft 42 via a hub, and rotates integrally with the motor shaft 42. During energization to the coil 52, the movable member 53 is attracted to the coil 52 side, and the movable member 53, the brake disc 54, and the brake plate 55 are separated respectively. On the other hand, when energization to the coil 52 is stopped, the movable member 53 is moved to the brake disc 54 side by means of urging means such as a spring not shown, so that the brake disc 54 is pressed against the brake plate 55, and rotation of the rotor is stopped.

(1-1-3. Input Side Encoder)

The input side encoder 60 detects the rotation speed, the position of the origin, and the like of the motor 40. An encoder case 61 of the input side encoder 60 is attached to the backward side of the motor housing 41 concentrically. The encoder case 61 has a cylindrical shape, and a support substrate 62 that supports a magnetic disc (permanent magnet) 63 for the input side encoder 60 is arranged in the inside of an encoder case 61. Such a support substrate 62 is fixed to the motor shaft 42, and the magnetic disc 63 and the support substrate 62 rotate integrally with the motor shaft 42. In addition, the input side encoder 60 includes a magnetic field detection element 65 that detects a change in magnetic field due to relative rotation of the magnetic disc 63 at a position opposed to the magnetic disc 63. The magnetic field detection element 65 is electrically connected to an input side encoder substrate 67 arranged on the outer peripheral part of the encoder case 61 via a flexible circuit board or the like. With such an input side encoder 60, rotation information such as the position of the origin and the rotation angle of the motor shaft 42 can be obtained. The input side encoder 60 can be configured similarly to the output side encoder 20 which will be described later.

(1-1-4. Strain Wave Gearing)

The strain wave gearing 30 functions as a reduction gear that decelerates and outputs the rotation of the motor 40. The strain wave gearing 30 includes an annular housing 31, an internal gear 32 fixed to the inner peripheral part of the housing 31, a cup-like flexible external gear 33 arranged on the inner peripheral part of the internal gear 32, and further, a wave generation part 34 arranged on the inner peripheral part of the flexible external gear 33. The cup-like flexible external gear 33 includes a cylindrical body part 33a that opens to the backward side, a diaphragm 33b extending to the inner side in the radial direction from the forward end in the body part 33a, a boss 33c extending forward continuously to the inner peripheral edge of the diaphragm 33b, and an external tooth 33d formed on the outer peripheral surface on the opening end side of the body part 33a. A rotation transfer member 35 is fixed to the boss 33c by means of fixation bolts 38.

The rotation transfer member 35 is supported by the housing 31 via a cross roller bearing 36. The flexible external gear 33 is supported by the housing 31 in a freely rotatable manner via the rotation transfer member 35 and the cross roller bearing 36. A support plate 39 to which a magnetic disc 21 of the output side encoder 20 has been fixed is mounted on the forward side of the housing 31.

The motor shaft 42 is arranged in the inside of the body part 33a of the flexible external gear 33, and the wave generation part 34 is fixed to the outer periphery of the motor shaft 42. Accordingly, the wave generation part 34 rotates integrally with the motor shaft 42. The wave generation part 34 has a cylindrical shape, and is provided with a wave bearing 37 on the outer periphery. The wave bearing 37 is a ball bearing including a flexible inner ring and outer ring, and is bent into an elliptical shape. A portion of the flexible external gear 33 where the external tooth 33d is formed is bent into an elliptical shape by the wave generation part 34, and the external tooth 33d is in mesh with the inner tooth of the internal gear 32 at two positions in the longitudinal direction of the ellipse.

The cross roller bearing 36 includes an outer ring 36a fixed to the housing 31, an inner ring 36b fixed to the outer periphery of the rotation transfer member 35, and a plurality of rollers 36c interposed between the outer ring 36a and the inner ring 36b. When the motor 40 is driven and the motor shaft 42 rotates, the rotation is decelerated by the wave generation part 34 and the flexible external gear 33 and is transferred to the rotation transfer member 35.

(1-1-5. Torque Sensor)

The torque sensor 100 detects rotation torque output from the strain wave gearing 30 and transferred to a target of rotation. The torque sensor 100 is provided continuously with the rotation transfer member 35 by means of the fixation bolts 38. The torque sensor 100 has a first rotating body 112 and a second rotating body 114 having diameters different from each other and provided concentrically. The first rotating body 112 on the inner side is fixed to the flexible external gear 33 and the rotation transfer member 35 by means of the fixation bolts 38. The second rotating body 114 on the outer side is connected to the first rotating body 112 via a strain generation part 121, and rotation torque input to the first rotating body 112 is transferred to the second rotating body 114 via the strain generation part 121. A target of rotation not shown is coupled to the second rotating body 114, and the target of rotation also rotates with the rotation of the second rotating body 114.

At this time, the strain generation part 121 transfers the rotation torque input to the first rotating body 112 to the second rotating body 114 while generating a strain. The strain generation part 121 is provided with a strain detection part not shown. The strain detection part is electrically connected to a circuit board 23 common to the output side encoder 20 via a flexible circuit board not shown and the like. The torque sensor 100 detects the rotation torque on the basis of the strain detected by the strain detection part.

(1-1-6. Output Side Encoder)

The output side encoder 20 detects the rotation angle and rotation speed of the rotation output to the target of rotation via the torque sensor 100. The output side encoder 20 is arranged on the inner periphery of the second rotating body 114. The encoder case 29 of the output side encoder 20 is arranged on the inner periphery of the second rotating body 114, and the circuit board 23 is assembled to the inside of the encoder case 29. The output side encoder 20 can be a magnetic encoder, for example.

A portion 29a of the encoder case 29 enters an opening 118 provided in the strain generation part 121 of the torque sensor 100, and a magnetic field detection element 25 is provided on an end surface of the portion 29a facing the backward side. A magnetic disc (permanent magnet) 21 for the output side encoder 20 is arranged on the support plate 39 of the strain wave gearing 30 opposed to the magnetic field detection element 25. The magnetic field detection element 25 is electrically connected to the circuit board 23, and detects a change in magnetic field caused by relative rotation between the magnetic disc 21 and the output side encoder 20. With such an output side encoder 20, rotation information such as the position of the origin and the rotation angle of the motor shaft 42 is obtained.

In the rotation actuator 1 according to the present embodiment, the length in the axial direction along the central axis A is shortened, and the ratio of the width in the axial direction to the width in the radial direction is made close to 1. In addition, in such a rotation actuator 1, by arranging the motor 40 at the center in the axial direction with the outer diameter of the motor 40 being the outermost diameter and arranging the other structural elements having small outer diameters on the both end sides in the axial direction, the rotation actuator 1 as a whole has a shape close to a sphere. In particular, in the rotation actuator 1 according to the present embodiment, by shortening the length of the torque sensor 100 in the axial direction and arranging the output side encoder 20 on the inner periphery of the torque sensor 100, the length in the axial direction required for the output side encoder 20 and the torque sensor 100 is shortened. Therefore, an arrangement space of the rotation actuator 1 at a joint or the like of a robot arm, for example, can be reduced, and extra space of the robot arm can be reduced.

An overview of an overall configuration of the rotation actuator 1 according to the present embodiment has been described so far. Hereinafter, a configuration of the torque sensor 100 integrated with the output side encoder 20 will be described in detail.

<1-2. Torque Sensor>

Figure 3:
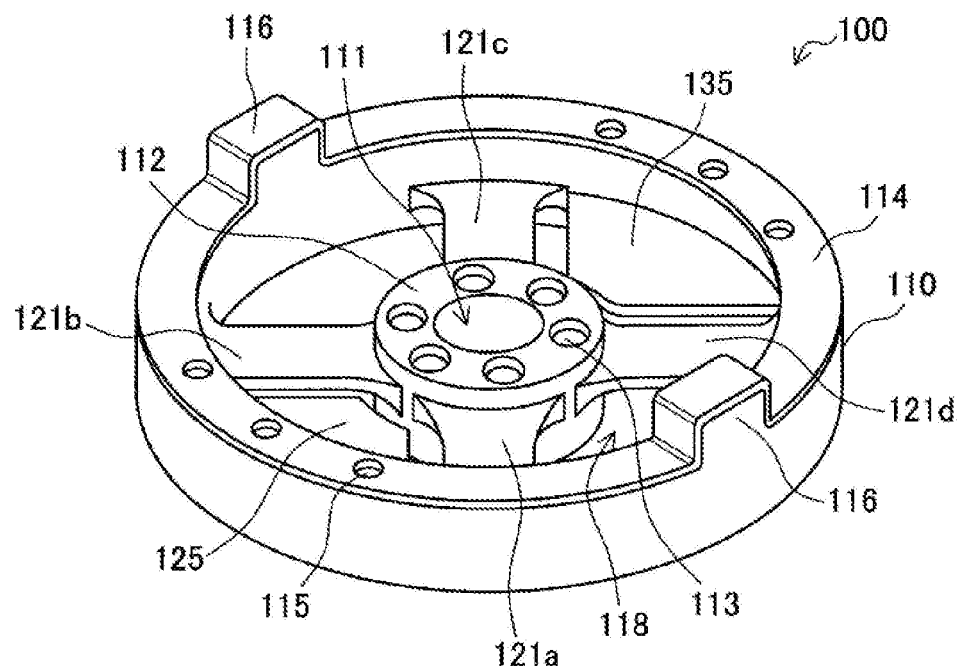
FIG. 3 is a perspective view of a base material of a torque sensor according to the embodiment as seen from the front side.
Figure 4:
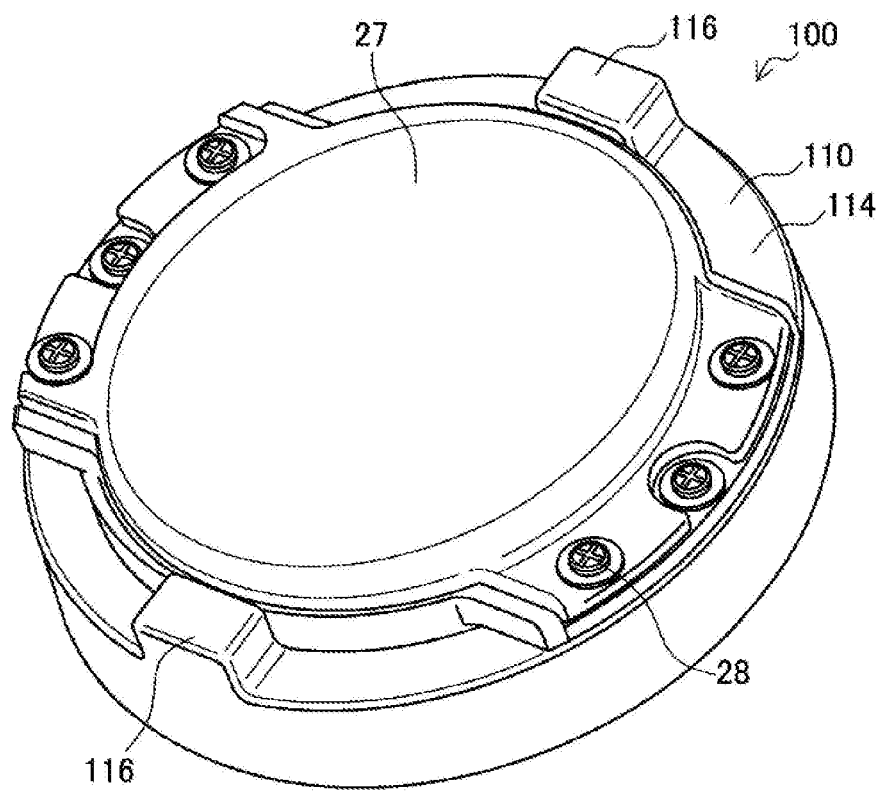
FIG. 4 is a perspective view of the torque sensor to which encoders have been attached as seen from the front side.
Figure 5:
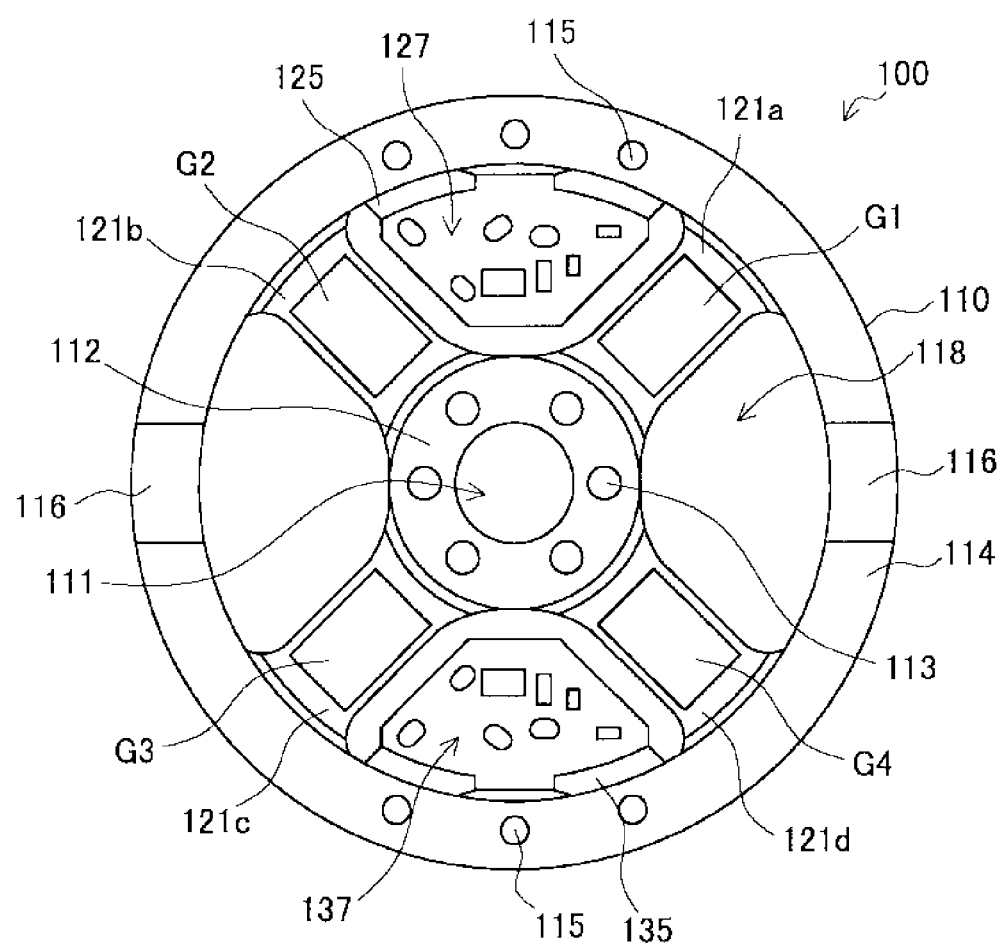
FIG. 5 is a front view showing a configuration example of the torque sensor according to the embodiment.
Figure 6:
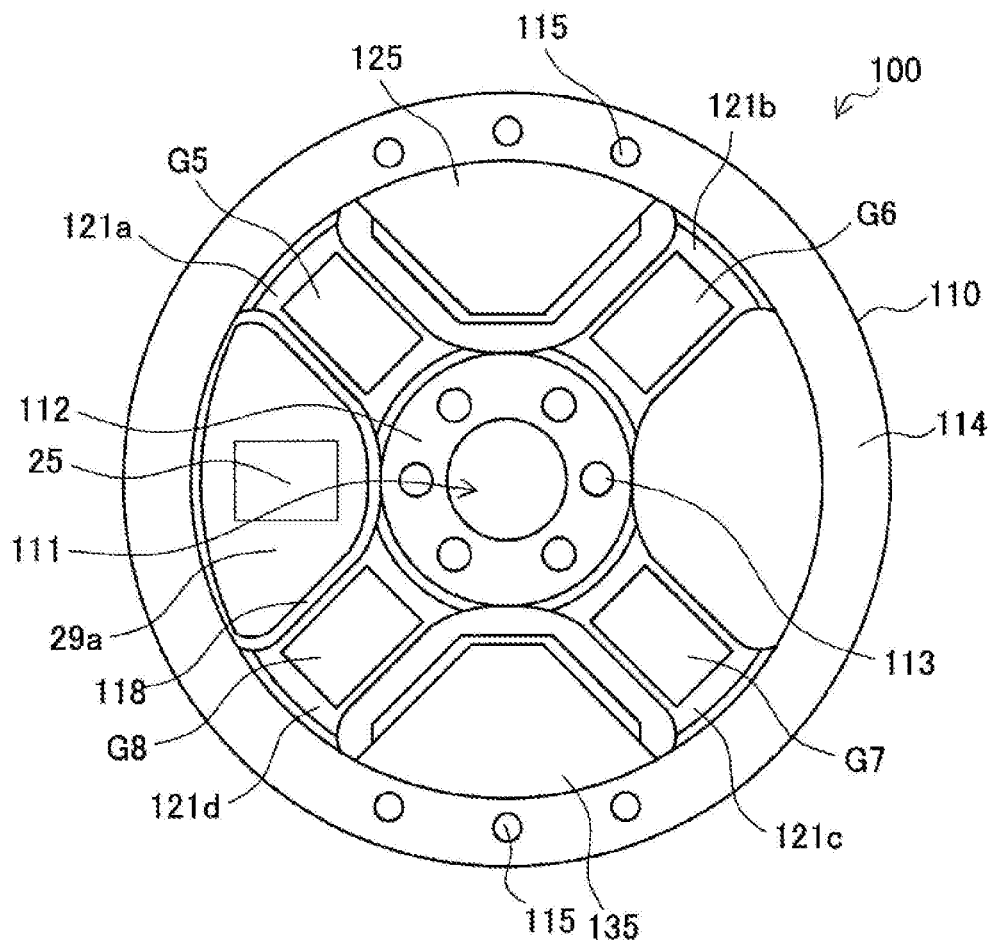
FIG. 6 is a rear view showing a configuration example of the torque sensor according to the embodiment.

Hereinafter, with reference to FIG. 3 to FIG. 7, a configuration of the torque sensor 100 included in the rotation actuator 1 according to the present embodiment will be described in detail. The output side encoder 20 is assembled and integrated into the torque sensor 100 according to the present embodiment. FIG. 3 is a perspective view of a base material 110 of the torque sensor 100 as seen from the front side (forward side). FIG. 4 is a perspective view of the torque sensor 100 in a state where a cover 27, the encoder case 29, and the circuit board 23 have been attached as seen from the front side. FIG. 5 is a plan view of the torque sensor 100, in which illustration of the encoder case 29 and the circuit board 23 is omitted, as seen from the front side (forward side). FIG. 6 is a plan view of the torque sensor 100 to which the output side encoder 20 has been assembled as seen from the rear side (backward side).

The torque sensor 100 has the base material 110. The base material 110 includes the first rotating body 112 and the second rotating body 114 having diameters different from each other and arranged concentrically, and the strain generation part 121 (121a, 121b, 121c, and 121d) provided between the first rotating body 112 and the second rotating body 114. In the torque sensor 100 according to the present embodiment, the first rotating body 112, the second rotating body 114, and the strain generation part 121 are formed integrally. For example, the base material 110 may be molded integrally by molding and cutting. However, the method of manufacturing the base material 110 is not limited. The constituent material of the base material 110 is not particularly limited, but various structural materials including a steel material and a nonferrous metal material can be used. The structural material should only be a material that can transfer rotation torque input to the first rotating body 112 to the second rotating body 114 and may generate a moderate strain.

The first rotating body 112 and the second rotating body 114 both have a cylindrical shape extending in a direction parallel to the central axis A. The first rotating body 112 is arranged on the inner side in the radial direction, and is capable of making axial rotation about an input axis that transfers rotation torque from the strain wave gearing 30. The second rotating body 114 is arranged on the outer side in the radial direction, and is capable of making axial rotation about an output axis that transfers rotation torque to a target of rotation. In the torque sensor 100 according to the present embodiment, the input axis and output axis both agree with the central axis A of the rotation actuator 1.

The first rotating body 112 has a central opening 111 through which the pipe 11 extends at the central part and a plurality of (in the illustrated example, six) holes 113 into which the fixation bolts 38 are inserted from the rear side. By being fixed to the rotation transfer member 35 by means of the fixation bolts 38, the first rotating body 112 is capable of receiving rotation torque transferred via the rotation transfer member 35 and making axial rotation about the central axis A. The second rotating body 114 has a plurality of (in the illustrated example, six) holes 115 in which fixation bolts 28 for fixing the cover 27 that supports the encoder case 29 and the circuit board 23 are inserted in the end surface on the front side. Three of the holes 115 are provided at symmetric positions about the central axis A, respectively. In the torque sensor 100 according to the present embodiment, the circuit board 23 serves both as a circuit board of the output side encoder 20 and a circuit board of the torque sensor 100.

In addition, the second rotating body 114 has projections 116 to be fitted into a target of rotation on the end surface on the front side. Two of the projections 116 are provided at symmetric positions about the central axis A, respectively. The second rotating body 114 is capable of receiving rotation torque transferred via the strain generation part 121 and making axial rotation about the central axis A.

The strain generation part 121 is configured as a plurality of (in the illustrated example, four) connection parts (beam parts) 121a, 121b, 121c, and 121d extending radially about the central axis A. The plurality of connection parts 121a, 121b, 121c, and 121d are provided at regular intervals in the circumferential direction. That is, in the torque sensor 100 according to the present embodiment, the four connection parts 121a, 121b, 121c, and 121d are provided at an interval of 90° in the circumferential direction. Such a strain generation part 121 transfers the rotation torque input to the first rotating body 112 to the second rotating body 114. Each of the connection parts 121a, 121b, 121c, and 121d has a first surface facing one side (forward side) in a first direction parallel to the input axis (the central axis A) and a second surface facing the other side (backward side) in the first direction.

In addition, each of the connection parts 121a, 121b, 121c, and 121d has a plate-like shape whose length (thickness) in the axial direction (the first direction) is smaller than the length (width) in the axial rotation direction of the input axis. Therefore, the connection parts 121a, 121b, 121c, and 121d may generate strains in the circumferential direction (shear direction) about the central axis A when transferring rotation torque. The front and rear surfaces of the plate-like connection parts 121a, 121b, 121c, and 121d are formed so as to be orthogonal to the central axis A.

The width of each of the connection parts 121a, 121b, 121c, and 121d in the circumferential direction can be 8.0 to 12.0 mm, for example, although it depends on the outer diameter of the torque sensor 100. In addition, the thickness of each of the connection parts 121a, 121b, 121c, and 121d can be 0.8 to 1.5 mm, for example, although it depends on the outer diameter of the torque sensor 100. If the width or the thickness of the connection parts 121a, 121b, 121c, and 121d in the circumferential direction is too large, the connection parts 121a, 121b, 121c, and 121d may be increased in rigidity to make it difficult to detect strains. On the other hand, if the width or the thickness of the connection parts 121a, 121b, 121c, and 121d in the circumferential direction is too small, the connection parts 121a, 121b, 121c, and 121d may be significantly decreased in rigidity to be incapable of withstanding rotation torque. Taking these points into consideration, the dimensions of the connection parts 121a, 121b, 121c, and 121d may be set appropriately.

On the front and rear surfaces of each of the plate-like connection parts 121a, 121b, 121c, and 121d, two-axis strain gauges G1 to G8 for shearing are arranged with an adhesive or the like as strain detection parts for detecting strains. The first strain gauge G1 is arranged on the first surface on the forward side of the first connection part 121a, and the fifth strain gauge G5 is arranged on the second surface on the backward side. The second strain gauge G2 is arranged on the second surface on the forward side of the second connection part 121b, and the sixth strain gauge G6 is arranged on the second surface on the backward side. The third strain gauge G3 is arranged on the first surface on the forward side of the third connection part 121c, and the seventh strain gauge G7 is arranged on the second surface on the backward side. The fourth strain gauge G4 is arranged on the first surface on the forward side of the fourth connection part 121d, and the eighth strain gauge G8 is arranged on the second surface on the backward side. The respective strain gauges G1 to G8 are arranged at equidistant positions from the central axis A.

Figure 7:
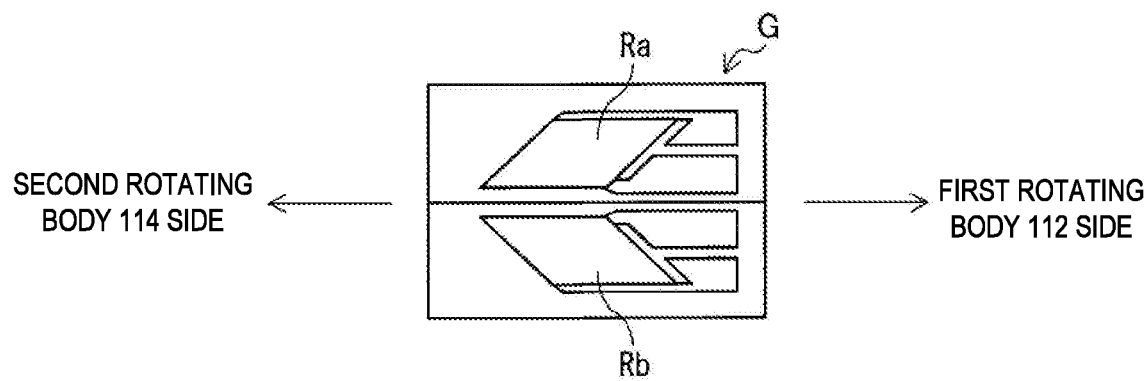
FIG. 7 is an explanatory diagram showing a configuration example of a strain gauge G.

FIG. 7 is an explanatory diagram showing a configuration example of a strain gauge G. The strain gauge G shown in FIG. 7 is a two-axis strain gauge for shearing, and has a first sensitive part Ra and a second sensitive part Rb in order to detect strains in two directions, respectively. The respective strain gauges G1 to G8 are arranged such that the first sensitive part Ra and the second sensitive part Rb are adjacent to each other in the circumferential direction about the central axis A. The first sensitive part Ra is formed in a direction orthogonal to the central axis A and inclined in the predetermined direction by 45 degrees with respect to the radial direction about the central axis A. Such a first sensitive part Ra detects a strain in the direction orthogonal to the central axis A and in a direction inclined in the predetermined direction by 45 degrees with respect to the radial direction about the central axis A. In addition, the second sensitive part Rb is formed in the direction orthogonal to the central axis A and orthogonal to the first sensitive part R1. Such a second sensitive part Rb detects a strain in the direction orthogonal to the central axis A and in a direction orthogonal to the detection direction of the first sensitive part Ra.

In the torque sensor 100 according to the present embodiment, a first sensor section includes the first strain gauge G1, the second strain gauge G2, the fifth strain gauge G5, and the sixth strain gauge G6 attached to the first connection part 121a and the second connection part 121b with an adhesive or the like. Each of the strain gauges G1, G2, G5, and G6 is electrically connected to a wiring pattern on a flexible circuit board not shown. A mounting part 127 for various electronic components of the flexible circuit board is arranged on the front side surface of a substrate arranging part 125 provided between the first connection part 121a and the second connection part 121b adjacent to each other.

Similarly, a second sensor section includes the third strain gauge G3, the fourth strain gauge G4, the seventh strain gauge G7, and the eighth strain gauge G8 attached to the third connection part 121c and the fourth connection part 121d with an adhesive or the like. Each of the strain gauges G3, G4, G7, and G8 is electrically connected to a wiring pattern on a flexible circuit board not shown. A mounting part 137 for various electronic components of the flexible circuit board is arranged on the front side surface of a substrate arranging part 135 provided between the third connection part 121c and the fourth connection part 121d adjacent to each other.

The strain wave gearing 30 often has vibration components in the axial direction and the radial direction of the central axis A, and may produce vibrations in the rotation direction in meshing between gears of the strain wave gearing 30. In addition, it is not always possible for the bearing part provided for the strain wave gearing 30 to remove all vibrations in the radial direction of the rotation axis. With vibration components that cannot be removed by the bearing part input to the strain generation part 121 for this reason, multi-axis forces other than rotation torque may be included in the output of the torque sensor 100.

Hence, in the torque sensor 100 according to the present embodiment, by configuring an equivalent circuit of an 8-active 4-gauge method to reduce the influence of multi-axis forces other than rotation torque, the accuracy of detecting rotation torque is improved. On that occasion, by making the outer shape of the torque sensor 100, in particular, the length of the torque sensor 100 in the axial direction small, the torque sensor 100 or the rotation actuator 1 is reduced in size.

Figure 8:
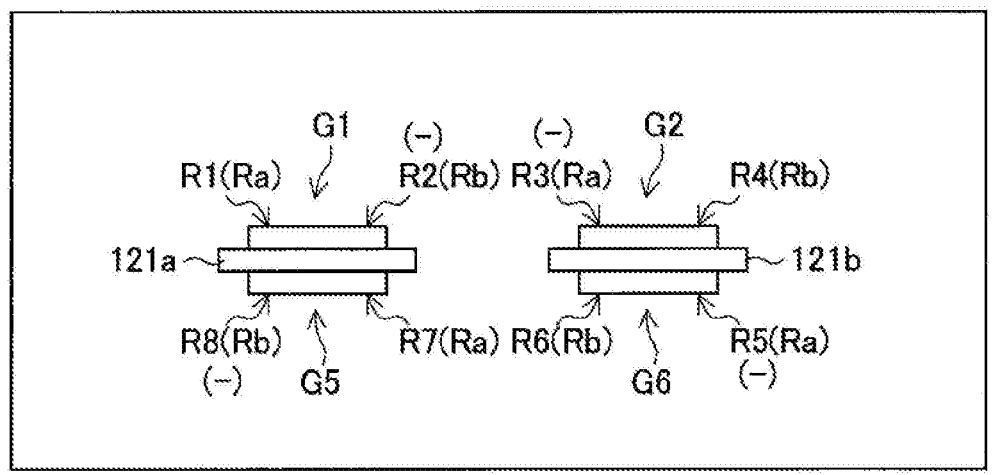
FIG. 8 is an explanatory diagram showing sensitive parts included in an equivalent circuit of the torque sensor according to the embodiment.
Figure 9:
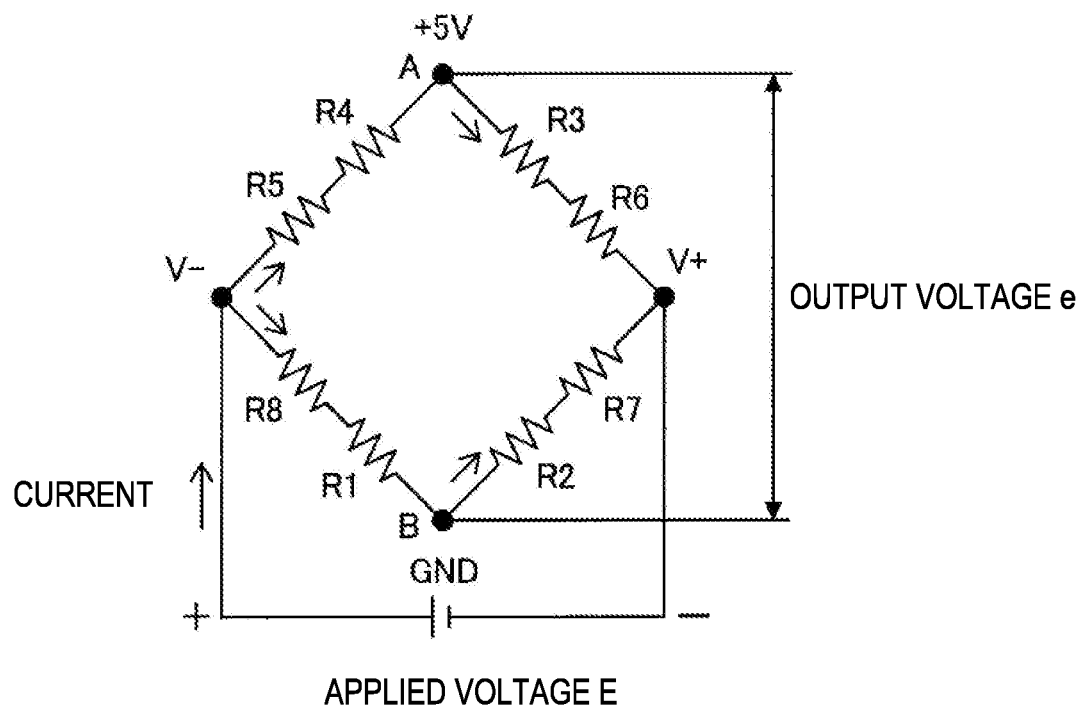
FIG. 9 is an explanatory diagram showing a configuration of the equivalent circuit of the torque sensor according to the embodiment.

FIG. 8 to FIG. 9 are explanatory diagrams showing a configuration example of the first sensor section. FIG. 8 is an explanatory diagram schematically showing an arrangement of the strain gauges G1, G2, G5, and G6 included in the first sensor section, and FIG. 9 is an equivalent circuit diagram of the first sensor section.

The strain gauges G1, G2, G5, and G6 included in the first sensor section are attached onto the first connection part 121a and the second connection part 121b extending in different directions by 90 degrees from the central axis A with an adhesive or the like. The first strain gauge G1 and the fifth strain gauge G5 are arranged on the front and rear surfaces of the first connection part 121a, and the second strain gauge G2 and the sixth strain gauge G6 are arranged on the front and rear surfaces of the second connection part 121b. Each of the strain gauges G1, G2, G5, and G6 has the first sensitive part Ra and the second sensitive part Rb, and the first sensor section has eight sensitive parts in total. By bridge connecting these sensitive parts in two sets, a bridge of the 8-active 4-gauge method (Wheatstone bridge) is configured.

In FIG. 9, assume that electric resistance values of the first sensitive part Ra and the second sensitive part Rb of the first strain gauge G1 and the fifth strain gauge G5 arranged on the front and rear surfaces of the first connection part 121a are R1, R2, R7, and R8, respectively. In addition, assume that electric resistance values of the first sensitive part Ra and the second sensitive part Rb of the second strain gauge G2 and the sixth strain gauge G6 arranged on the front and rear surfaces of the second connection part 121b are R3, R4, R5, R6, respectively. A circuit in which the resistors R1, R2, R7, and R8 are connected in series and a circuit in which the resistors R3, R4, R5, and R6 are connected in series are formed, and when these circuits are connected in parallel to each other, the bridge of the 8-active 4-gauge method is configured.

When rotation torque about the central axis A is input to the strain generation part 121 and a strain occurs, the first connection part 121a and the second connection part 121b also deform slightly, and the resistance values of the first sensitive part Ra and the second sensitive part Rb change depending on the amount of deformation. When applying a voltage VE to the both ends of the circuit in which the group of the respective resistors R1 to R8 are connected in parallel, a potential difference Ve appearing between intermediate points of the group of the respective resistors R1 to R8 becomes a sensor output of the torque sensor 100. The relation between the applied voltage VE and the output voltage Ve is as follows:

$$Ve = VE[\{(R7-R2)/(R1-R8+R7-R2)\} - \{(R6-R3)/(R4-R5+R6-R3)\}]$$

That is, the influence of bending strain or tensile compression deformation occurred in the first connection part 121a and the second connection part 121b, caused by eccentricity of the central axis A or temperature variations, is cancelled by arranging strain gauges on the respective front and rear surfaces of the first connection part 121a and the second connection part 121b extending in different directions by 90 degrees, and a strain in the shear direction can be detected with high accuracy. In addition, by arranging the strain gauges G1, G2, G5, and G6 on the front and rear surfaces of the first connection part 121a and the second connection part 121b to configure the first sensor section, a strain of the strain generation part 121 can be detected as a large output even in the case where the strain is small.

In addition, in the torque sensor 100 according to the present embodiment, also in the third connection part 121c and the fourth connection part 121d, strain gauges can be arranged on the respective front and rear surfaces to configure the second sensor section including the bridge of the 8-active 4-gauge method, similarly to the first connection part 121a and the second connection part 121b. In this case, since the first connection part 121a and the third connection part 121c as well as the second connection part 121b and the fourth connection part 121d are arranged diagonally about the central axis A, and are provided equidistantly from the central axis A, torque noise detected in the first sensor section and torque noise detected in the second sensor section appear in opposite phases. Accordingly, two-line torque outputs can be detected with one strain generation part 121, and a noise component can be removed by the resultant force.

Figure 10:
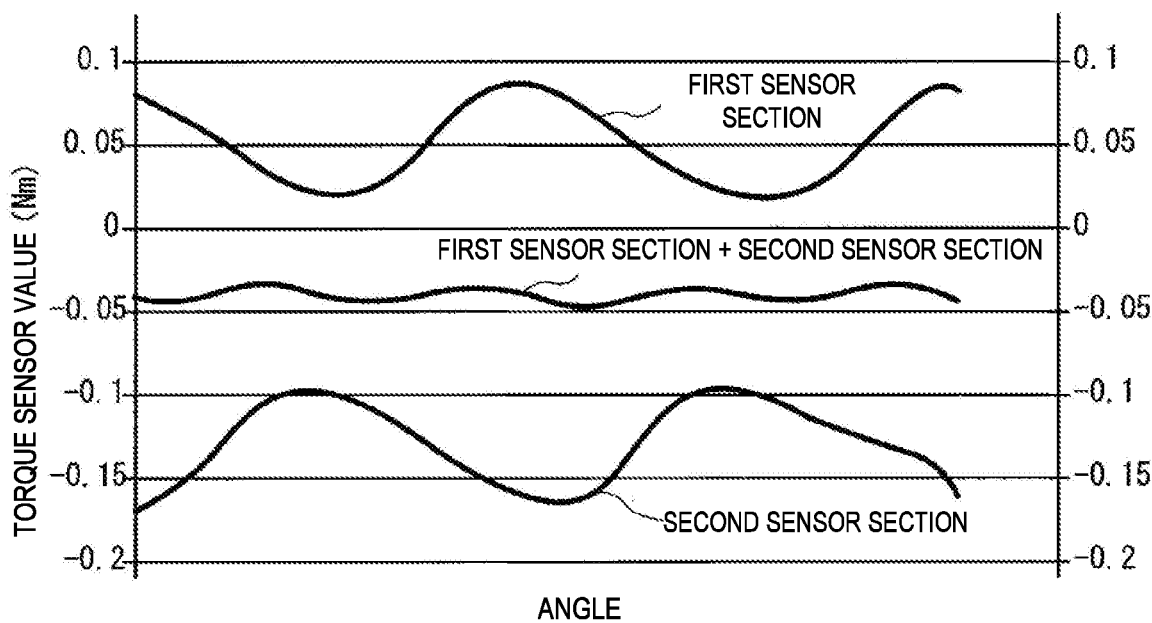
FIG. 10 is an explanatory diagram showing torque variations in the torque sensor.

FIG. 10 shows sensor values (output voltages) detected by the first sensor section and the second sensor section and the added value of the sensor values of the first sensor section and the second sensor section. By adding the sensor value of the first sensor section and the sensor value of the second sensor section arranged diagonally about the central axis A, it is understood that a torque variation of about 0.1 Nm has been reduced to about 0.02 Nm. In the torque sensor 100 of the present disclosure, however, the second sensor section is not indispensable.

In the torque sensor 100 configured in this manner, since the connection parts 121a, 121b, 121c, and 121d as the strain generation part 121 have a small thickness, the lengths of the first rotating body 112 and the second rotating body 114 in the axial direction can be shortened. In the torque sensor 100 according to the present embodiment, the length of the second rotating body 114 in the axial direction is longer than the length of the first rotating body 112 in the axial direction, and the length of the torque sensor 100 in the axial direction is determined by the length of the second rotating body 114 in the axial direction. For example, the length of the second rotating body 114 in the axial direction not including the projection 116 can be 7.0 to 15.0 mm.

In addition, in the torque sensor 100 according to the present embodiment, at least part of the output side encoder 20 is arranged on the inner periphery of the second rotating body 114. As shown in FIG. 1 and FIG. 4, in the torque sensor 100 according to the present embodiment, the surface of the cover 27 that supports the encoder case 29 of the output side encoder 20 and the circuit board 23 generally matches the tip position of the projection 116 provided for the second rotating body 114 of the torque sensor 100. Thus, the total length in the axial direction including the torque sensor 100 and the output side encoder 20 is shortened, and the length of the actuator 1 in the axial direction is reduced. In addition, since the torque sensor 100 and the output side encoder 20 have small outer diameters as compared with the strain wave gearing 30, the shape of the actuator 1 as a whole is made close to a sphere.

The output side encoder 20 includes the encoder case 29, the circuit board 23 arranged on the inner periphery of the encoder case 29, the magnetic disc (permanent magnet) 21, and the magnetic field detection element 25. The encoder case 29 and the circuit board 23 are at least partially arranged on the inner periphery of the second rotating body 114 of the torque sensor 100, and are fixed to the front-side end surface of the second rotating body 114 by means of the fixation bolts 28. The portion 29a of the encoder case 29 enters the opening 118 between the first connection part 121a and the fourth connection part 121d of the torque sensor 100, and the end surface of the portion 29a is positioned on a surface substantially identical to the end surface on the rear side of the torque sensor 100 (see FIG. 2). The magnetic field detection element 25 is provided on the end surface of the portion 29a of the encoder case 29.

Figure 11:
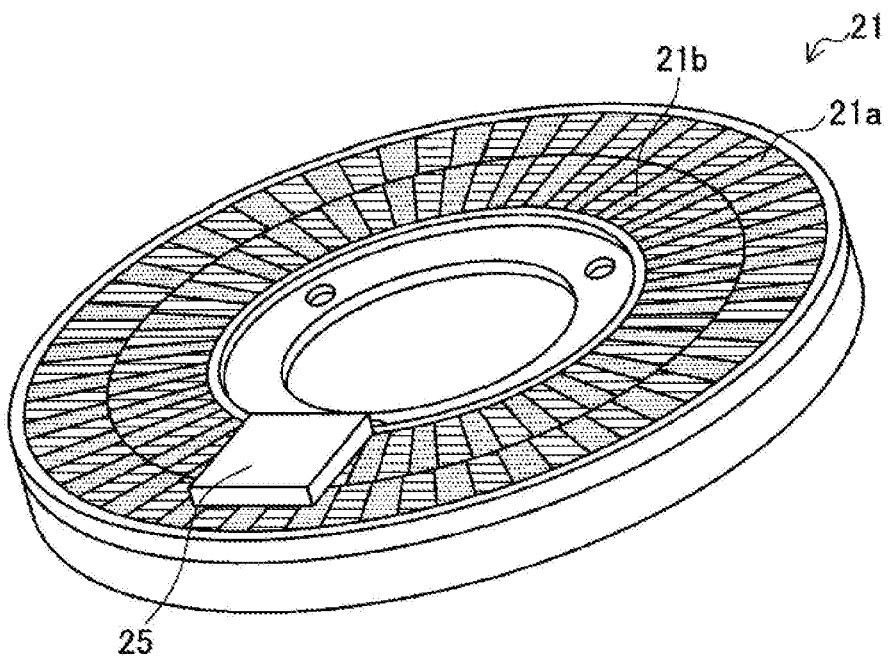
FIG. 11 is an explanatory diagram showing a configuration example of an encoder.

FIG. 11 is a schematic view showing a configuration example of the output side encoder 20. The output side encoder 20 includes the disc-like magnetic disc 21, and the magnetic field detection element 25 that detects a change in magnetic field associated with relative rotation with the magnetic disc 21. As described above, the disc-like magnetic disc 21 is fixed to the support plate 39 of the strain wave gearing 30 in a concentric manner with the central axis A. The magnetic disc 21 has a first magnetic pole row 21a and a second magnetic pole row 21b in which a positive pole and a negative pole are arrayed alternately in two rows on the outer side and inner side in the radial direction. The magnetic field detection element 25 has two each, a total of four hole elements, for detecting respective magnetic fields of the first magnetic pole row 21a and the second magnetic pole row 21b. The magnetic field detection element 25 may be an IC chip including a plurality of hole elements and an AD converter, for example.

The number of pairs of a positive pole and a negative pole of the second magnetic pole row 21b on the inner side in the radial direction is made smaller than the number of pairs of a positive pole and a negative pole of the first magnetic pole row 21a on the outer side in the radial direction by one, and on the basis of output of electric signals in accordance with the magnetic fields detected, respectively, rotation information such as the rotation angle and rotation speed can be detected. That is, when the position of the magnetic field detection element 25 with respect to the magnetic disc 21 changes with the rotation of the torque sensor 100, the magnetic flux density of each of the first magnetic pole row 21a and the second magnetic pole row 21b detected by the magnetic field detection element 25 changes. At this time, since the first magnetic pole row 21a and the second magnetic pole row 21b are different in the number of pairs of a positive pole and a negative pole by one, a combination of the magnetic force of the first magnetic pole row 21a and the magnetic force of the second magnetic pole row 21b detected by the magnetic field detection element 25 will not be the same during a 360° rotation.

Figure 12:
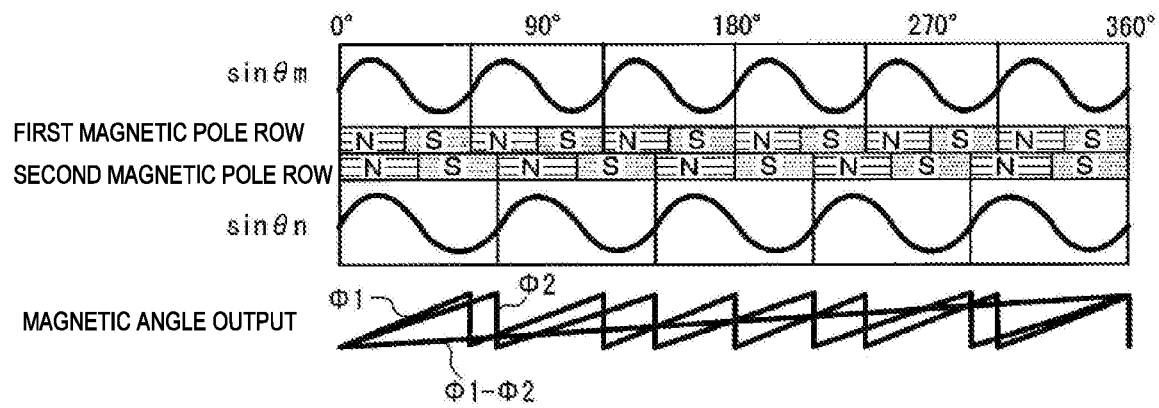
FIG. 12 is a schematic view showing a method of detecting a rotation angle by an output side encoder 20 shown in FIG. 11.

FIG. 12 is a schematic view showing a method of detecting a rotation angle by the output side encoder 20 shown in FIG. 11. In the example shown in FIG. 12, the number of pairs of a positive pole and a negative pole in the second magnetic pole row 21b is five, and the number of pairs of a positive pole and a negative pole in the first magnetic pole row 21a is six. In FIG. 12, a detection signal sin θm from the first magnetic pole row 21a and the first magnetic pole row 21a and a detection signal sin θn from the second magnetic pole row 21b and the second magnetic pole row 21b are shown. In addition, magnetic angle outputs Φ1, Φ2 that may be generated by the detection signal sin θm from the first magnetic pole row 21a and the detection signal sin θn from the second magnetic pole row 21b and a difference (Φ1−Φ2) between the magnetic angle outputs are shown on the lower side of FIG. 12.

Such an output side encoder 20 oscillates the detection signal sin θm from the first magnetic pole row 21a in a 60° period, and oscillates the detection signal sin θn from the second magnetic pole row 21b in a 72° period during a 360° rotation. Then, the difference in magnetic angle outputs between the both changes linearly from 0° to 360°. Therefore, by obtaining such magnetic angle outputs, the rotation angle can be detected.

The output side encoder 20 according to the present embodiment can be reduced in length in the axial direction since the magnetic disc 21 has a disc-like shape and the magnetic field detection element 25 includes a planar chip opposite to the magnetic disc 21. In addition, the magnetic disc 21 is attached to the support plate 39 of the strain wave gearing 30, and the encoder case 29 and the circuit board 23 are arranged on the inner periphery of the second rotating body 114 of the torque sensor 100. Then, utilizing an opening region provided in the strain generation part 121 of the torque sensor 100, the magnetic field detection element 25 is made opposite to the magnetic disc 21. Therefore, the length in the axial direction required for the torque sensor 100 and the output side encoder 20 can be reduced further.

Note that the input side encoder 60 may have a configuration similar to the output side encoder 20.

As described above, with the torque sensor 100 according to the present embodiment, the strain generation part 121 that connects the first rotating body 112 and the second rotating body 114 is the plate-like strain generation part 121 whose length (thickness) in the axial direction is small, and the strain gauges G1 to G8 are arranged on the both surfaces of the strain generation part 121, so that rotation torque is detected. Therefore, the length of the torque sensor 100 in the axial direction can be shortened.

In addition, the torque sensor 100 according to the present embodiment includes an equivalent circuit of the 8-active 4-bridge method, and a vibration component other than rotation torque is removed to increase the accuracy of detecting rotation torque. Further, in the case of respectively arranging the strain gauges diagonally about the central axis A to configure the first sensor section and the second sensor section and detect rotation torque on the basis of the resultant force of the both, noise can be removed, and the detection accuracy can be increased further.

In addition, in the torque sensor 100 according to the present embodiment, the output side encoder 20 is arranged utilizing the inner periphery of the second rotating body 114 of the torque sensor 100. Therefore, the length in the axial direction required for the torque sensor 100 and the output side encoder 20 is shortened, and the length of the whole rotation actuator 1 can be shortened. Then, in the rotation actuator 1, the motor 40 and the strain wave gearing 30 having large outer diameters are arranged at the center in the axial direction, and structural members having smaller outer diameters are arranged toward the outer side in the axial direction. Therefore, the whole rotation actuator 1 can be configured in a spherical shape. Accordingly, space reduction of the rotation actuator 1 is achieved.

2. Second Embodiment

Next, a torque sensor 150 according to a second embodiment of the present disclosure will be described. In the torque sensor 150 according to the present embodiment, rather than arranging strain gauge elements as strain detection parts on the front and rear surfaces of the connection parts 121a to 121d, a strain generation part 161 with gauge patterns as strain detection parts deposited on the both surfaces of the connection parts 121a to 121d is used.

Figure 13:
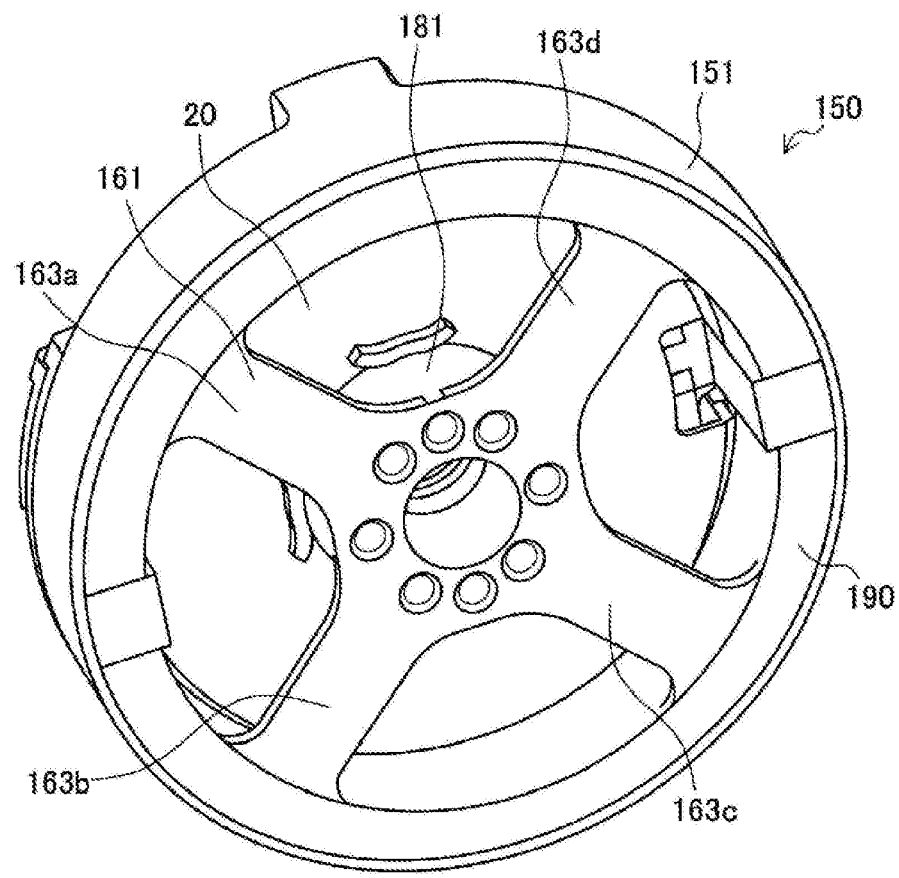
FIG. 13 is a perspective view of a torque sensor according to a second embodiment of the present disclosure as seen from the rear side.
Figure 14:
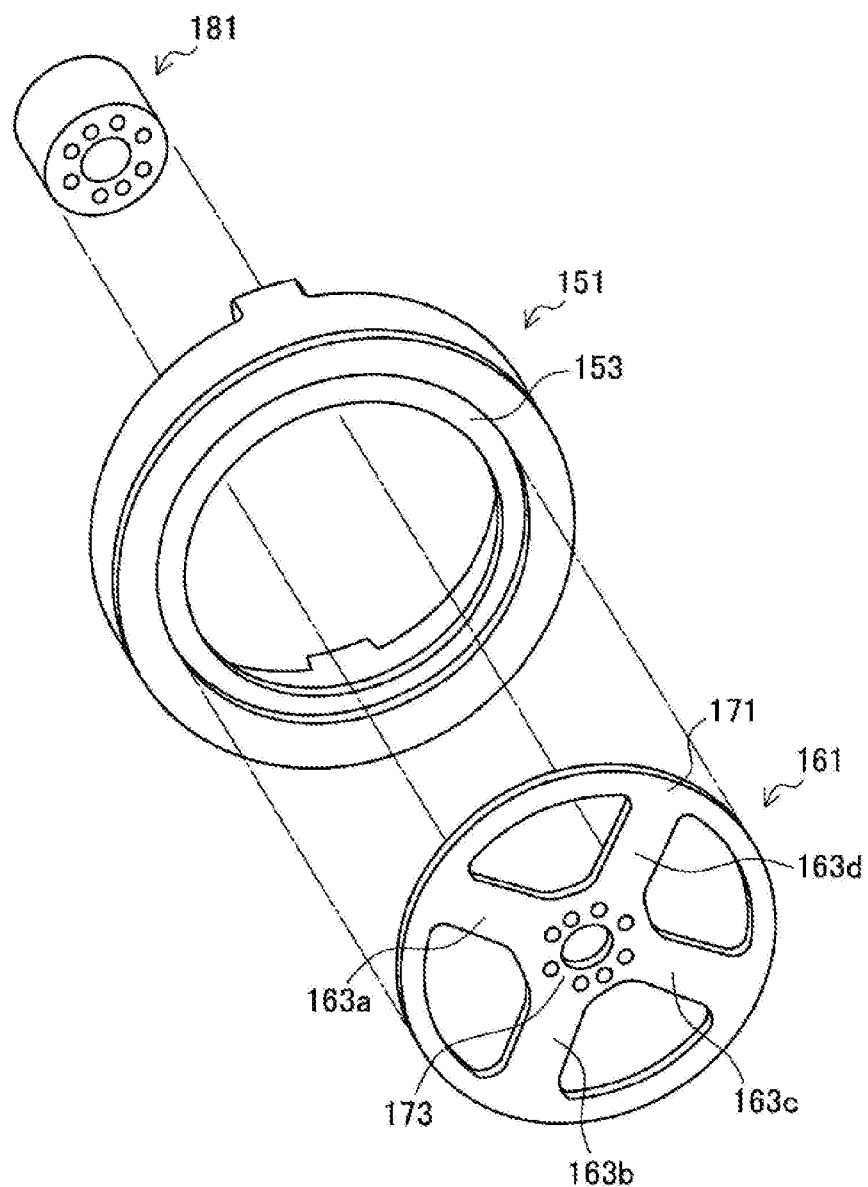
FIG. 14 is an exploded perspective view of the torque sensor according to the embodiment.
Figure 15:
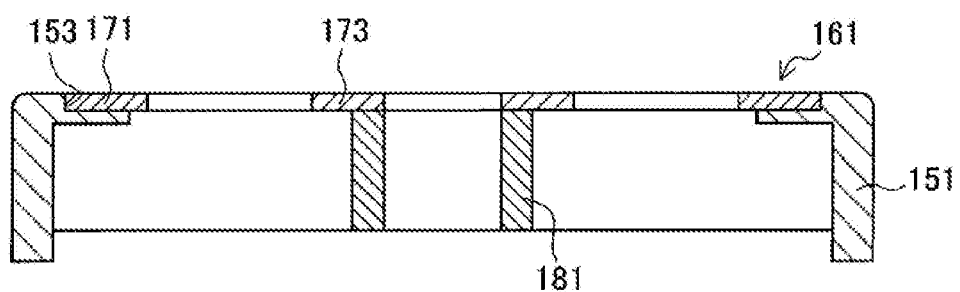
FIG. 15 is a sectional view of the torque sensor according to the embodiment.

FIG. 13 to FIG. 16 are explanatory diagrams showing a configuration of the torque sensor 150 according to the present embodiment. FIG. 13 is a perspective view of the torque sensor 150 according to the present embodiment as seen from the rear side (backward side), and FIG. 14 is an exploded perspective view of a first rotating body 181, a second rotating body 151, and the strain generation part 161 of the torque sensor 150 according to the present embodiment. FIG. 15 is an axial sectional view of the first rotating body 181, the second rotating body 151, and the strain generation part 161 of the torque sensor 150 as assembled.

In the torque sensor 150 according to the present embodiment, the first rotating body 181, the second rotating body 151, and the strain generation part 161 are molded as separate structural elements, respectively, and are joined to one another. Specifically, as shown in FIG. 14 and FIG. 15, the first rotating body 181 is fixed to a central part 173 of the strain generation part 161 from the front surface side (forward side) by means of fixation bolts or the like not shown. In addition, the second rotating body 151 has a recessed part 153 in a surface on the rear side (backward side) in which the strain generation part 161 is arranged, and an outer edge part 171 of the strain generation part 161 is joined to the recessed part 153 of the second rotating body 151. A flexible circuit board 190 is arranged along the end surface on the rear side of the second rotating body 151, and part of the flexible circuit board 190 is connected to a circuit board in the inside of the encoder case 29 attached to the front surface side of the second rotating body 151.

Figure 16:
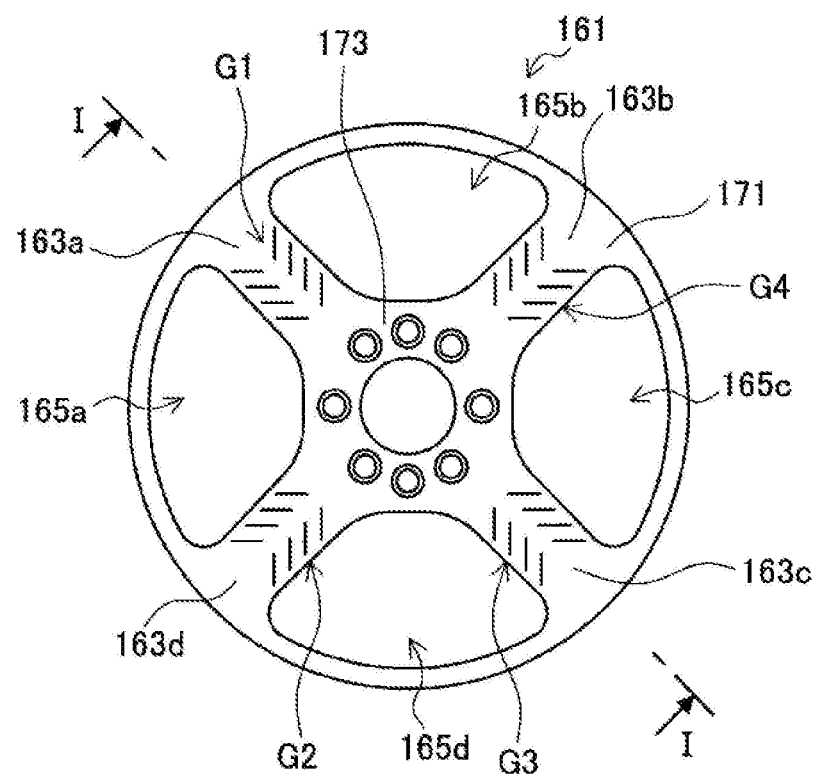
FIG. 16 is a plan view showing a strain generation part of the torque sensor according to the embodiment.
Figure 17:
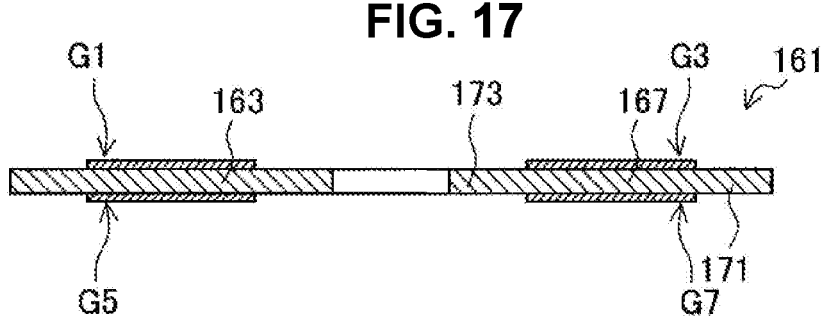
FIG. 17 is a sectional view of the strain generation part of the torque sensor according to the embodiment.

FIG. 16 is a plan view of the strain generation part 161 as seen from the front surface side (forward side), and FIG. 17 is a sectional view schematically showing a section taken along the line I-I of FIG. 16. The strain generation part 161 has the central part 173 to which the first rotating body 181 is fixed, the outer edge part 171 joined to the second rotating body 151, and a plurality of (in the illustrated example, four) connection parts (beam parts) 163 (163a, 163b, 163c, and 163d) extending radially about the central axis A to connect the central part 173 and the outer edge part 171. The gauge patterns G1 to G8 are formed on the front and rear surfaces of the respective connection parts 163, respectively.

Specifically, the first gauge pattern G1 is formed on the forward side surface of the first connection part 163a, and the fifth gauge pattern G5 is formed on the backward side surface. The second gauge pattern G2 is formed on the forward side surface of the second connection part 163b, and the sixth gauge pattern G6 is formed on the backward side surface. The third gauge pattern G3 is formed on the forward side surface of the third connection part 163c, and the seventh gauge pattern G7 is formed on the backward side surface. The fourth gauge pattern G4 is formed on the forward side surface of the fourth connection part 163d, and the eighth gauge pattern G8 is formed on the backward side surface. The respective gauge patterns G1 to G8 are formed at equidistant positions from the central axis A.

The gauge patterns G1 to G8 may be formed by, for example, after forming an SiOx film as an insulation film on the strain generation part 161 by a radio frequency (RF) sputtering method, further forming a CrOx film by the radio frequency (RF) sputtering method, and performing patterning by a photolithography method. At this time, in order to increase adhesion of the SiOx film or the CrOx film, the surface of the strain generation part 161 may be subjected to mirror polishing processing. Since the strain generation part 161 of the torque sensor 150 according to the present embodiment has a thin plate shape and both the front and rear surfaces are flat surfaces, mirror polishing processing is easily carried out on both the front and rear surfaces. In addition, since both the front and rear surfaces of the strain generation part 161 are flat surfaces, deposition can be performed on the same plane, and the accuracy of deposition can be improved.

As a result, adhesion of all the gauge patterns G1 to G8 is increased. Accordingly, resistance values of the gauge patterns G1 to G8 are stabilized, and the strain detecting accuracy can be improved. That is, since an adhesive does not intervene between the gauge patterns G1 to G8 and the strain generation part 161, a strain detection part having high sensitivity to a strain can be obtained. In addition, adhesion is high and a risk such as detachment is reduced as compared with the case of bonding strain gauges onto a strain generation part using an adhesive. Further, in the case of strain gauges, a skilled person may manually attach the strain gauges to a strain generation part, whilst the gauge patterns G1 to G8 are deposited on the surfaces of the strain generation part 161 through physical vapor deposition, which allows stable production with a deposition device or the like and provides excellent mass productivity.

Note that the constituent material of the insulation film is not limited to SiOx, but another electrically insulating material may be used. In addition, the constituent material of the gauge patterns G1 to G8 is not limited to CrOx, but another electrically conductive material may be used. In addition, although not shown, a wiring pattern for electrically connecting the gauge patterns G1 to G8 to the flexible circuit board 190 may be formed on the strain generation part 161. In addition, after forming the gauge patterns G1 to G8 or the wiring pattern, further, an SiOx film as a protective film may be laminated.

Also in the torque sensor 150 according to the present embodiment, the first sensor section may include the gauge patterns G1, G2, G5, and G6, for example, formed on both the front and rear surfaces of the first connection part 163a and the second connection part 163b of the strain generation part 161, and the second sensor section may include the gauge patterns G3, G4, G7, and G8 formed on both the front and rear surfaces of the third connection part 163c and the fourth connection part 163d of the strain generation part 161. Accordingly, strain sensors of an equivalent circuit of the 8-active 4-gauge method are configured, and the influence of bending strain or tensile compression deformation occurred in the first connection part 163a and the second connection part 163b, caused by eccentricity of the central axis A or temperature variations, is cancelled, and a strain in the shear direction can be detected with high accuracy. In addition, by arranging the strain gauges G1, G2, G5, and G6 on the front and rear surfaces of the first connection part 163a and the second connection part 163b to configure the first sensor section, a strain of the strain generation part 121 can be detected as a large output even in the case where the strain is small.

In the foregoing, in the torque sensor 150 according to the present embodiment, the first rotating body 181 and the second rotating body 151 include separate members, and are integrally coupled by the thin-plate like strain generation part 161. Thus, both the front and rear surfaces of the strain generation part 161 become flat surfaces and can be subjected to mirror polishing processing, and the gauge patterns G1 to G8 having high adhesion can be obtained efficiently by a radio frequency sputtering method and photolithography method. In addition, since such gauge patterns G1 to G8 are directly patterned on the strain generation part 161, strain sensitivity can be increased. Then, also in accordance with the torque sensor 150 according to the present embodiment, the strain generation part 161 has a thin plate shape whose length (thickness) in the axial direction is small, so that the torque sensor 150 can be reduced in size.

In addition, also in the torque sensor 150 according to the present embodiment, the output side encoder can be arranged on the inner periphery of the second rotating body 151 similarly to the torque sensor 100 according to the first embodiment. Therefore, also in accordance with the rotation actuator 1 including the torque sensor 150 according to the present embodiment, the rotation actuator 1 can be reduced in size, and the spherical rotation actuator 1 can obtained.

3. Reference Example

Next, a torque sensor according to a reference example related to the rotation actuator 1 of the present disclosure will be described.

Figure 18:
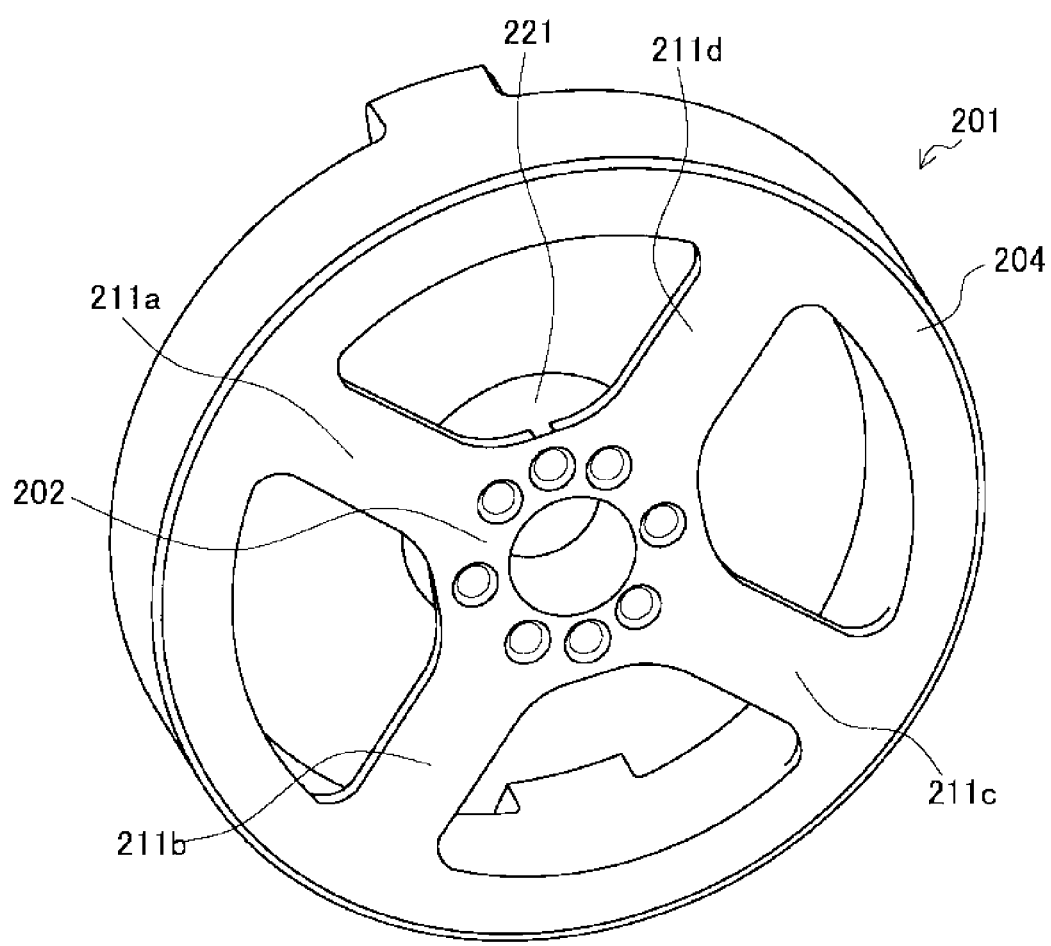
FIG. 18 is a perspective view of a torque sensor according to a related technology of the present disclosure as seen from the rear side.
Figure 19:
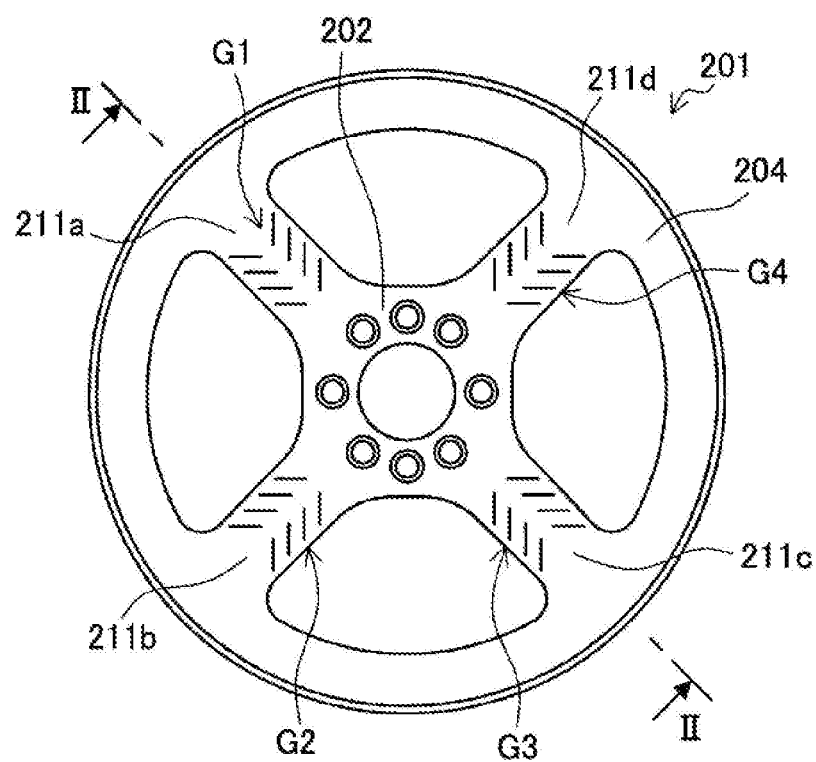
FIG. 19 is a rear view of the torque sensor according to the related technology.
Figure 20:
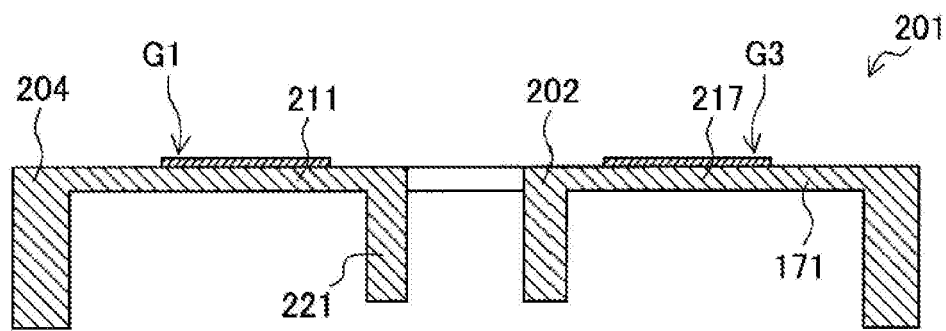
FIG. 20 is a sectional view of the torque sensor according to the related technology.

FIG. 18 to FIG. 20 are explanatory diagrams showing a base material 201 of the torque sensor according to the reference example. FIG. 18 is a perspective view of the base material 201 as seen from the rear side (backward side), and FIG. 19 is a plan view of the base material 201 as seen from the rear side (backward side). In addition, FIG. 20 is a sectional view of the base material 201 taken along the line II-II of FIG. 19.

The base material 201 of the torque sensor according to the reference example basically has a configuration identical to the base material 110 of the torque sensor 100 according to the first embodiment. That is, a first rotating body 202, a second rotating body 204, and a strain generation part 211 (211a, 211b, 211c, 211d) provided between the first rotating body 202 and the second rotating body 204 are molded integrally.

On the other hand, in the base material 201, the end surface on the backward side including the strain generation parts 211 is a flat surface, and the gauge patterns G1 to G4 are formed on such a flat surface. That is, since the end surface on the backward side of the base material 201 is a flat surface, the end surface can be subjected to mirror polishing processing, and patterning can be performed on the same surface. Accordingly, the gauge patterns G1 to G4 having excellent adhesion can be formed, and the strain detecting accuracy can be improved. The gauge patterns G1 to G4 can be formed through deposition processing by a radio frequency sputtering method and patterning processing by a photolithography method, similarly to the gauge patterns of the torque sensor 150 according to the second embodiment.

The torque sensor according to the reference example can be subjected to mirror polishing processing since the first rotating body 202, the second rotating body 204, and the strain generation part 211 are molded integrally and the end surface of the base material 201 is a flat surface, and the gauge patterns G1 to G8 having high adhesion can be efficiently obtained by a radio frequency sputtering method and photolithography method. In addition, since such gauge patterns G1 to G8 are directly patterned on the strain generation part 211, strain sensitivity can be increased. Then, also in accordance with the torque sensor according to the reference example, the torque sensor can be reduced in size since the strain generation part 211 has a thin plate shape whose length (thickness) in the axial direction is small.

In addition, also in the torque sensor according to the reference example, the output side encoder can be arranged on the inner periphery of the second rotating body 204, similarly to the torque sensor 100 according to the first embodiment. Therefore, also in accordance with the rotation actuator including the torque sensor according to the reference example, the rotation actuator can be reduced in size, and the spherical rotation actuator can be obtained.

In this case, strain gauges may be attached to the surface of the strain generation part 211 on the front surface side (forward side) with an adhesive or the like. By arranging the strain gauges on the front surface side of the strain generation part 211, strain sensors of an equivalent circuit of the 8-active 4-gauge method similar to the torque sensor 100 according to the first embodiment can be obtained. Alternatively, strain sensors of the equivalent circuit of the 8-active 4-gauge method through use of the gauge patterns G1 to G4 formed on the rear side can be adopted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A torque sensor including:

a first rotating body capable of making axial rotation about an input axis;

a second rotating body capable of making axial rotation about an output axis;

a strain generation part provided between the first rotating body and the second rotating body, having a first surface facing one side in a first direction parallel to the input axis and a second surface facing the other side in the first direction, and configured to transfer rotation torque while generating a strain between the first rotating body and the second rotating body; and a plurality of strain detection parts provided on the first surface and the second surface, respectively, to detect a strain of the strain generation part.

(2)

The torque sensor according to (1), in which the plurality of strain detection parts include a first strain gauge, a second strain gauge, a third strain gauge, and a fourth strain gauge that are provided on the first surface to detect shear stress acting on the strain generation part, and a fifth strain gauge, a sixth strain gauge, a seventh strain gauge, and an eighth strain gauge that are provided on the second surface to detect shear stress acting on the strain generation part, and configure an equivalent circuit of an 8-active 4-gauge method.

(3)

The torque sensor according to (1) or (2), in which the strain generation part includes a plurality of connection parts extending radially between the first rotating body and the second rotating body.

(4)

The torque sensor according to (3), in which the plurality of connection parts have a plate like shape in which a width in the first direction is smaller than a width in an axial rotation direction of the input axis.

(5)

The torque sensor according to (3) or (4), in which a circuit board to which the plurality of strain detection parts are electrically connected is arranged between adjacent connection parts among the plurality of connection parts.

(6)

The torque sensor according to any one of (3) to (5), in which the plurality of strain detection parts include a first strain detection part provided on the first surface of a first connection part among the plurality of connection parts, a second strain detection part provided on the first surface of a second connection part among the plurality of connection parts, a third strain detection part provided on the second surface of the first connection part, and a fourth strain detection part provided on the second surface of the second connection part.

(7)

The torque sensor according to (6), in which the first connection part and the second connection part are connection parts adjacent in an axial rotation direction of the input axis.

(8)

The torque sensor according to (6) or (7), in which the first strain detection part, the second strain detection part, the third strain detection part, and the fourth strain detection part are arranged equidistantly from the input axis.

(9)

The torque sensor according to any one of (6) to (8), in which each of the first strain detection part, the second strain detection part, the third strain detection part, and the fourth strain detection part includes a first sensitive part configured to detect a strain in a direction orthogonal to the input axis and in a direction inclined in a predetermined direction by 45 degrees with respect to a radial direction about the input axis and a second sensitive part configured to detect a strain in the direction orthogonal to the input axis and in a direction orthogonal to a detection direction of the first sensitive part to configure an equivalent circuit of an 8-active 4-gauge method.

(10)

The torque sensor according to any one of (6) to (9), in which the first connection part and the second connection part are connection parts adjacent in an axial rotation direction of the input axis, and the plurality of strain detection parts include a fifth strain detection part provided on the first surface of a third connection part provided at a position diagonal to the first connection part about the input axis, a sixth strain detection part provided on the first surface of a fourth connection part provided at a position diagonal to the second connection part about the input axis, a seventh strain detection part provided on the second surface of the third connection part, and an eighth strain detection part provided on the second surface of the fourth connection part.

(11)

The torque sensor according to (10), in which each of the fifth strain detection part, the sixth strain detection part, the seventh strain detection part, and the eighth strain detection part includes a first sensitive part configured to detect a strain in a direction orthogonal to the input axis and in a direction inclined in a predetermined direction by 45 degrees with respect to a radial direction about the input axis and a second sensitive part configured to detect a strain in the direction orthogonal to the input axis and in a direction orthogonal to a detection direction of the first sensitive part to configure an equivalent circuit of an 8-active 4-gauge method.

(12)

The torque sensor according to any one of (1) to (11), in which the strain detection parts are strain gauges arranged on the first surface and the second surface of the strain generation part.

(13)

The torque sensor according to (1) to (11), in which the strain detection parts are gauge patterns deposited on the first surface and the second surface of the strain generation part.

(14)

The torque sensor according to (13), in which at least one surface of the first surface and the second surface of the strain generation part, an end surface of the first rotating body in the first direction, and an end surface of the second rotating body in the first direction reside on an identical plane.

(15)

The torque sensor according to any one of (1) to (14), in which the strain generation part formed as a separate member is joined to at least one of the first rotating body and the second rotating body.

(16)

A power control actuator including:

a first rotating body capable of making axial rotation about an input axis;

a second rotating body capable of making axial rotation about an output axis;

a strain generation part provided between the first rotating body and the second rotating body, having a first surface facing one side in a first direction parallel to the input axis and a second surface facing the other side in the first direction, and configured to transfer rotation torque while generating a strain between the first rotating body and the second rotating body;

a plurality of strain detection parts provided on the first surface and the second surface, respectively, to detect a strain of the strain generation part; and an encoder fixed to at least one of the first rotating body and the second rotating body.

(17)

The power control actuator according to (16), in which the first rotating body and the second rotating body are provided as concentric circles having diameters different from each other, and at least part of the encoder is arranged on an inner peripheral side of the second rotating body positioned on an outer peripheral side.

(18)

The power control actuator according to (16) or (17), in which the strain generation part includes a plurality of connection parts extending radially between the first rotating body and the second rotating body, and at least part of the encoder is arranged between the plurality of connection parts adjacent in an axial rotation direction of the input axis.

(19)

The power control actuator according to (18), in which the encoder includes a circuit board arranged on the one side to which the first surface of the strain generation part faces, a magnetic disc oppositely arranged on the other side to which the second surface of the strain generation part faces, and a magnetic field detection element arranged between the plurality of connection parts adjacent in the axial rotation direction of the input axis to detect a magnetic field generated by the magnetic disc.

REFERENCE SIGNS LIST 1 power control actuator (rotation actuator)
20 output side encoder
21 magnetic disc
23 circuit board
25 magnetic field detection element
29 encoder case
30 strain wave gearing
40 motor
50 brake mechanism
60 input side encoder
100 torque sensor
110 base material
112 first rotating body
114 second rotating body
121 strain generation part
121a, 121b, 121c, 121d connection part

The invention claimed is:

1. A torque sensor comprising:
a first rotating body capable of making axial rotation about an input axis;
a second rotating body capable of making axial rotation about an output axis, the second rotating body comprising two projections fitted into a target of rotation on an end surface on a front side of the second rotating body;
a strain generation part provided between the first rotating body and the second rotating body, having a first surface facing one side in a first direction parallel to the input axis and a second surface facing the other side in the first direction, and configured to transfer rotation torque while generating a strain between the first rotating body and the second rotating body; and
a plurality of strain detection parts provided on the first surface and the second surface, respectively, to detect a strain of the strain generation part;
an encoder fixed to at least one of the first rotating body and the second rotating body;
wherein the strain generation part comprises a beam having a "I" shape with a larger width in an axial rotation direction of the input axis at both ends of the beam toward the first rotating body and the second rotating body respectively, a whole end surface of the "I" shape is in direct contact with the second rotating body, and another whole end surface of the "I" shape is in direct contact with the first rotating body;
a thickness of the strain generation part in the first direction is smaller than a minimum width of the strain generation part in the axial rotation direction of the input axis;
wherein the strain generation part includes a plurality of connection parts extending radially between the first rotating body and the second rotating body, and at least part of the encoder is arranged between the plurality of connection parts adjacent in the axial rotation direction of the input axis, and
the encoder includes a circuit board arranged on one side of the torque sensor to which the first surface of the strain generation part faces, a magnetic disc oppositely arranged on the other side of the torque sensor to which the second surface of the strain generation part faces, and a magnetic field detection element arranged between the plurality of connection parts adjacent in the axial rotation direction of the input axis to detect a magnetic field generated by the magnetic disc.

2. The torque sensor according to claim 1, wherein the plurality of strain detection parts include
a first strain gauge, a second strain gauge, a third strain gauge, and a fourth strain gauge that are provided on the first surface to detect shear stress acting on the strain generation part, and
a fifth strain gauge, a sixth strain gauge, a seventh strain gauge, and an eighth strain gauge that are provided on the second surface to detect shear stress acting on the strain generation part, and
configure an equivalent circuit of an 8-active 4-gauge method.

3. The torque sensor according to claim 1, wherein the strain generation part includes a plurality of connection parts extending radially between the first rotating body and the second rotating body.

4. The torque sensor according to claim 3, wherein the plurality of connection parts have a plate like shape in which a width in the first direction is smaller than a width in an axial rotation direction of the input axis.

5. The torque sensor according to claim 3, wherein a circuit board to which the plurality of strain detection parts are electrically connected is arranged between adjacent connection parts among the plurality of connection parts.

6. The torque sensor according to claim 3, wherein the plurality of strain detection parts include a first strain detection part provided on the first surface of a first connection part among the plurality of connection parts, a second strain detection part provided on the first surface of a second connection part among the plurality of connection parts, a third strain detection part provided on the second surface of the first connection part, and a fourth strain detection part provided on the second surface of the second connection part.

7. The torque sensor according to claim 6, wherein the first connection part and the second connection part are connection parts adjacent in an axial rotation direction of the input axis.

8. The torque sensor according to claim 6, wherein the first strain detection part, the second strain detection part, the third strain detection part, and the fourth strain detection part are arranged equidistantly from the input axis.

9. The torque sensor according to claim 6, wherein each of the first strain detection part, the second strain detection part, the third strain detection part, and the fourth strain detection part includes a first sensitive part configured to detect a strain in a direction orthogonal to the input axis and in a direction inclined in a predetermined direction by 45 degrees with respect to a radial direction about the input axis and a second sensitive part configured to detect a strain in the direction orthogonal to the input axis and in a direction orthogonal to a detection direction of the first sensitive part to configure an equivalent circuit of an 8-active 4-gauge method.

10. The torque sensor according to claim 6, wherein the first connection part and the second connection part are connection parts adjacent in an axial rotation direction of the input axis, and
the plurality of strain detection parts include a fifth strain detection part provided on the first surface of a third connection part provided at a position diagonal to the first connection part about the input axis, a sixth strain detection part provided on the first surface of a fourth connection part provided at a position diagonal to the second connection part about the input axis, a seventh strain detection part provided on the second surface of the third connection part, and an eighth strain detection part provided on the second surface of the fourth connection part.

11. The torque sensor according to claim 10, wherein each of the fifth strain detection part, the sixth strain detection part, the seventh strain detection part, and the eighth strain detection part includes a first sensitive part configured to detect a strain in a direction orthogonal to the input axis and in a direction inclined in a predetermined direction by 45 degrees with respect to a radial direction about the input axis and a second sensitive part configured to detect a strain in the direction orthogonal to the input axis and in a direction orthogonal to a detection direction of the first sensitive part to configure an equivalent circuit of an 8-active 4-gauge method.

12. The torque sensor according to claim 1, wherein the strain detection parts are strain gauges arranged on the first surface and the second surface of the strain generation part.

13. The torque sensor according to claim 1, wherein the strain detection parts are gauge patterns deposited on the first surface and the second surface of the strain generation part.

14. The torque sensor according to claim 13, wherein at least one surface of the first surface and the second surface of the strain generation part, an end surface of the first rotating body in the first direction, and an end surface of the second rotating body in the first direction reside on an identical plane.

15. The torque sensor according to claim 1, wherein the strain generation part formed as a separate member is joined to at least one of the first rotating body and the second rotating body.

16. A power control actuator comprising:
a first rotating body capable of making axial rotation about an input axis;
a second rotating body capable of making axial rotation about an output axis, the second rotating body comprising two projections fitted into a target of rotation on an end surface on a front side of the second rotating body;
a strain generation part provided between the first rotating body and the second rotating body, having a first surface facing one side in a first direction parallel to the input axis and a second surface facing the other side in the first direction, and configured to transfer rotation torque while generating a strain between the first rotating body and the second rotating body;
a plurality of strain detection parts provided on the first surface and the second surface, respectively, to detect a strain of the strain generation part; and
an encoder fixed to at least one of the first rotating body and the second rotating body;
wherein the strain generation part comprises a beam having a "I" shape with a larger width in an axial rotation direction of the input axis at both ends of the beam toward the first rotating body and the second rotating body respectively, a whole end surface of the "I" shape is in direct contact with the second rotating body, and another whole end surface of the "1" shape is in direct contact with the first rotating body; and a thickness of the strain generation part in the first direction is smaller than a minimum width of the strain generation part in the axial rotation direction of the input axis, wherein the strain generation part includes a plurality of connection parts extending radially between the first rotating body and the second rotating body, and at least part of the encoder is arranged between the plurality of connection parts adjacent in the axial rotation direction of the input axis, and the encoder includes a circuit board arranged on one side of the power control actuator to which the first surface of the strain generation part faces, a magnetic disc oppositely arranged on the other side of the power control actuator to which the second surface of the strain generation part faces, and a magnetic field detection element arranged between the plurality of connection parts adjacent in the axial rotation direction of the input axis to detect a magnetic field generated by the magnetic disc.

17. The power control actuator according to claim 16, wherein the first rotating body and the second rotating body are provided as concentric circles having diameters different from each other, and at least part of the encoder is arranged on an inner peripheral side of the second rotating body positioned on an outer peripheral side.

* * * * *